US007900134B2

(12) United States Patent
Ardeleanu et al.

(10) Patent No.: US 7,900,134 B2
(45) Date of Patent: *Mar. 1, 2011

(54) AUTHORING ARBITRARY XML DOCUMENTS USING DHTML AND XSLT

(75) Inventors: Adriana Ardeleanu, Redmond, WA (US); Jean D. Paoli, Kirkland, WA (US); Stephen J. Mooney, Seattle, WA (US); Suryanarayanan V. Raman, Mercer Island, WA (US); Rajesh K. Jha, Bellevue, WA (US); Prakash Sikchi, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 901 days.

This patent is subject to a terminal disclaimer.

(21) Appl. No.: 11/557,931

(22) Filed: Nov. 8, 2006

(65) Prior Publication Data
US 2007/0074106 A1 Mar. 29, 2007

Related U.S. Application Data

(63) Continuation of application No. 09/599,813, filed on Jun. 21, 2000, now Pat. No. 7,191,394.

(51) Int. Cl.
*G06F 17/00* (2006.01)
(52) U.S. Cl. ............... 715/234; 715/236; 715/248; 715/273
(58) Field of Classification Search ............ 715/241, 715/234–239
See application file for complete search history.

(56) References Cited

U.S. PATENT DOCUMENTS 4,201,978 A   5/1980   Nally
4,498,147 A   2/1985   Agnew et al.
4,514,800 A   4/1985   Gruner et al.
4,564,752 A   1/1986   Lepic et al.
4,641,274 A   2/1987   Swank
4,674,040 A   6/1987   Barker et al.
4,723,211 A   2/1988   Barker et al.
4,739,477 A   4/1988   Barker et al.
4,815,029 A   3/1989   Barker et al.
4,847,749 A   7/1989   Collins et al.
4,910,663 A   3/1990   Bailey
4,926,476 A   5/1990   Covey (Continued)

FOREIGN PATENT DOCUMENTS

EP    0841615    5/1998

(Continued)

OTHER PUBLICATIONS

Pacheco, Xavier et al., "Delphi 5 Developer's Guide", Sames Publishing. Chapter 31, Section: Data Streaming,(1999), 4.

(Continued)

*Primary Examiner*—Doug Hutton
*Assistant Examiner*—Quoc A Tran

(57) ABSTRACT

Methods and systems of authoring XML using DHTML views and XSLT are described. Various user interfaces can be automatically or semi-automatically provided in a DHTML view that enable a user to interact with the DHTML view. The interfaces, some of which are termed "in document" interfaces, permit a user to interact with a DHTML view and have those interactions automatically made to a corresponding XML document that describes data that is associated with the DHTML view.

20 Claims, 5 Drawing Sheets

U.S. PATENT DOCUMENTS

| | | |
|---|---|---|
| 4,933,880 A | 6/1990 | Borgendale et al. |
| 4,962,475 A | 10/1990 | Hernandez et al. |
| 5,025,484 A | 6/1991 | Yamanari et al. |
| 5,072,412 A | 12/1991 | Henderson, Jr. et al. |
| 5,140,563 A | 8/1992 | Thinesen |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,220,649 A | 6/1993 | Forcier |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,251,273 A | 10/1993 | Betts et al. |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,133 A | 9/1997 | Malamud et al. |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,031 A | 10/1998 | Nielsen |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,845,122 A | 12/1998 | Nielsen et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,873,088 A | 2/1999 | Hayashi et al. |
| 5,905,492 A | 5/1999 | Straub et al. |
| 5,907,621 A | 5/1999 | Bachman et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,919,247 A | 7/1999 | Van Hoff et al. |
| 5,922,072 A | 7/1999 | Hutchinson et al. |
| 5,928,363 A | 7/1999 | Ruvolo |
| 5,929,858 A | 7/1999 | Shibata et al. |
| 5,940,075 A | 8/1999 | Mutschler, III et al. |
| 5,950,010 A | 9/1999 | Hesse et al. |
| 5,953,731 A | 9/1999 | Glaser |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni et al. |
| 5,991,731 A | 11/1999 | Colon et al. |
| 5,991,877 A | 11/1999 | Luckenbaugh |

| | | |
|---|---|---|
| 5,995,103 A | 11/1999 | Ashe |
| 5,999,740 A | 12/1999 | Rowley |
| 6,005,570 A | 12/1999 | Gayraud et al. |
| 6,006,227 A | 12/1999 | Freeman et al. |
| 6,012,066 A | 1/2000 | Discount et al. |
| 6,014,135 A | 1/2000 | Fernandes |
| 6,016,520 A | 1/2000 | Facq et al. |
| 6,018,743 A | 1/2000 | Xu |
| 6,021,403 A | 2/2000 | Horvitz et al. |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,057,837 A | 5/2000 | Hatakeda et al. |
| 6,058,413 A | 5/2000 | Flores et al. |
| 6,065,043 A | 5/2000 | Domenikos et al. |
| 6,069,626 A | 5/2000 | Cline et al. |
| 6,070,184 A | 5/2000 | Blount et al. |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,679 A | 7/2000 | Barkley |
| 6,088,708 A | 7/2000 | Burch et al. |
| 6,091,417 A | 7/2000 | Lefkowitz |
| 6,094,657 A | 7/2000 | Hailpern et al. |
| 6,096,096 A | 8/2000 | Murphy et al. |
| 6,097,382 A | 8/2000 | Rosen et al. |
| 6,098,081 A | 8/2000 | Heidorn et al. |
| 6,105,012 A | 8/2000 | Chang et al. |
| 6,108,637 A | 8/2000 | Blumenau |
| 6,108,783 A | 8/2000 | Krawczyk et al. |
| 6,115,646 A | 9/2000 | Fiszman et al. |
| 6,121,965 A | 9/2000 | Kenney et al. |
| 6,122,647 A | 9/2000 | Horowitz et al. |
| 6,144,969 A | 11/2000 | Inokuchi et al. |
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,167,523 A | 12/2000 | Strong |
| 6,182,094 B1 | 1/2001 | Humpleman et al. |
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,423 B1 | 4/2001 | Davis |
| 6,219,698 B1 | 4/2001 | Iannucci et al. |
| 6,225,996 B1 | 5/2001 | Gibb et al. |
| 6,235,027 B1 | 5/2001 | Herzon |
| 6,243,088 B1 | 6/2001 | McCormack et al. |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,272,506 B1 | 8/2001 | Bell |
| 6,275,227 B1 | 8/2001 | DeStefano |
| 6,275,599 B1 | 8/2001 | Adler et al. |
| 6,279,042 B1 | 8/2001 | Ouchi |
| 6,281,896 B1 | 8/2001 | Alimpich et al. |
| 6,282,709 B1 | 8/2001 | Reha et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,292,941 B1 | 9/2001 | Jollands |
| 6,297,819 B1 | 10/2001 | Furst |
| 6,300,948 B1 | 10/2001 | Geller et al. |
| 6,307,955 B1 | 10/2001 | Zank et al. |
| 6,308,179 B1 | 10/2001 | Petersen et al. |
| 6,308,273 B1 | 10/2001 | Goertzel et al. |
| 6,311,221 B1 | 10/2001 | Raz et al. |
| 6,311,271 B1 | 10/2001 | Gennaro et al. |
| 6,314,415 B1 | 11/2001 | Mukherjee |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,336,214 B1 * | 1/2002 | Sundaresan .................. 717/143 |
| 6,342,907 B1 | 1/2002 | Petty et al. |
| 6,343,149 B1 | 1/2002 | Motoiwa |
| 6,343,302 B1 | 1/2002 | Graham |
| 6,343,377 B1 | 1/2002 | Gessner et al. |
| 6,344,862 B1 | 2/2002 | Williams et al. |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,351,574 B1 | 2/2002 | Yair et al. |
| 6,353,851 B1 | 3/2002 | Anupam et al. |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,389,434 B1 | 5/2002 | Rivette et al. |
| 6,393,456 B1 | 5/2002 | Ambler et al. |
| 6,393,469 B1 | 5/2002 | Dozier et al. |
| 6,396,488 B1 | 5/2002 | Simmons et al. |
| 6,397,264 B1 | 5/2002 | Stasnick et al. |
| 6,405,221 B1 | 6/2002 | Levine et al. |
| 6,405,238 B1 | 6/2002 | Votipka |
| 6,408,311 B1 | 6/2002 | Baisley et al. |
| 6,414,700 B1 | 7/2002 | Kurtenbach et al. |
| 6,421,070 B1 | 7/2002 | Ramos et al. |
| 6,421,656 B1 | 7/2002 | Cheng et al. |
| 6,421,777 B1 | 7/2002 | Pierre-Louis |
| 6,425,125 B1 | 7/2002 | Fries et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,442,563 B1 | 8/2002 | Bacon et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu et al. |
| 6,463,419 B1 | 10/2002 | Kluss |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,007 B1 | 12/2002 | Pang |
| 6,493,702 B1 | 12/2002 | Adar et al. |

| Patent No. | Date | Inventor(s) |
|---|---|---|
| 6,501,864 B1 | 12/2002 | Eguchi et al. |
| 6,502,101 B1 | 12/2002 | Verprauskus et al. |
| 6,502,103 B1 | 12/2002 | Frey et al. |
| 6,505,200 B1 | 1/2003 | Ims et al. |
| 6,505,230 B1 | 1/2003 | Mohan et al. |
| 6,505,300 B2 | 1/2003 | Chen et al. |
| 6,507,856 B1 | 1/2003 | Chen et al. |
| 6,516,322 B1 | 2/2003 | Meredith |
| 6,519,617 B1 | 2/2003 | Wanderski et al. |
| 6,523,027 B1 | 2/2003 | Underwood |
| 6,529,909 B1 | 3/2003 | Bowman-Amuah |
| 6,535,229 B1 | 3/2003 | Kraft |
| 6,535,883 B1 | 3/2003 | Lee et al. |
| RE38,070 E | 4/2003 | Spies et al. |
| 6,546,546 B1 | 4/2003 | Van Doorn |
| 6,546,554 B1 | 4/2003 | Schmidt et al. |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,469 B1 | 6/2003 | Chiang et al. |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,594,686 B1 | 7/2003 | Edwards et al. |
| 6,598,219 B1 | 7/2003 | Lau |
| 6,603,489 B1 | 8/2003 | Edlund et al. |
| 6,604,099 B1 | 8/2003 | Chung et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastrianni et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,633,315 B1 | 10/2003 | Sobeski et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,661,920 B1 | 12/2003 | Skinner |
| 6,668,369 B1 | 12/2003 | Krebs et al. |
| 6,671,805 B1 | 12/2003 | Brown et al. |
| 6,675,202 B1 | 1/2004 | Perttunen |
| 6,678,717 B1 | 1/2004 | Schneider |
| 6,681,370 B2 | 1/2004 | Gounares et al. |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Lapstun et al. |
| 6,725,426 B1 | 4/2004 | Pavlov |
| 6,728,755 B1 | 4/2004 | de Ment |
| 6,735,721 B1 | 5/2004 | Morrow et al. |
| 6,745,367 B1 | 6/2004 | Bates et al. |
| 6,748,385 B1 | 6/2004 | Rodkin et al. |
| 6,748,569 B1 * | 6/2004 | Brooke et al. .............. 715/207 |
| 6,751,777 B2 | 6/2004 | Bates et al. |
| 6,754,874 B1 | 6/2004 | Silverbrook et al. |
| 6,757,826 B1 | 6/2004 | Paltenghe |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,828,992 B1 | 12/2004 | Freeman et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,862,689 B2 | 3/2005 | Bergsten et al. |
| 6,871,220 B1 | 3/2005 | Rajan et al. |
| 6,871,345 B1 | 3/2005 | Crow et al. |
| 6,874,130 B1 | 3/2005 | Baweja et al. |
| 6,876,996 B2 | 4/2005 | Czajkowski et al. |
| 6,883,168 B1 | 4/2005 | James et al. |
| 6,889,359 B1 | 5/2005 | Conner et al. |
| 6,901,403 B1 | 5/2005 | Bata et al. |
| 6,915,454 B1 | 7/2005 | Moore et al. |
| 6,925,609 B1 | 8/2005 | Lucke |
| 6,931,532 B1 | 8/2005 | Davis et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,129 B1 | 9/2005 | Loghmani |
| 6,948,133 B2 | 9/2005 | Haley |
| 6,948,135 B1 | 9/2005 | Ruthfield et al. |
| 6,948,980 B1 | 9/2005 | Malcolm |
| 6,950,987 B1 | 9/2005 | Hargraves et al. |
| 6,957,395 B1 | 10/2005 | Jobs et al. |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |
| 6,993,714 B2 | 1/2006 | Kaler et al. |
| 6,993,722 B1 | 1/2006 | Greer et al. |
| 6,996,776 B1 | 2/2006 | Makely et al. |
| 6,996,781 B1 | 2/2006 | Myers et al. |
| 7,000,179 B2 | 2/2006 | Yankovich et al. |
| 7,002,560 B2 | 2/2006 | Graham |
| 7,003,548 B1 | 2/2006 | Barck et al. |
| 7,003,722 B2 | 2/2006 | Rothchiller et al. |
| 7,010,580 B1 | 3/2006 | Fu et al. |
| 7,020,869 B2 | 3/2006 | Abrari et al. |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,043,687 B2 | 5/2006 | Knauss et al. |
| 7,051,273 B1 | 5/2006 | Holt et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,076,728 B2 | 7/2006 | Davis et al. |
| 7,080,083 B2 | 7/2006 | Kim et al. |
| 7,080,325 B2 | 7/2006 | Treibach-Heck et al. |

| | | | | | | |
|---|---|---|---|---|---|---|
| 7,081,882 B2 | 7/2006 | Sowden et al. | | 2001/0056460 A1 | 12/2001 | Sahota et al. |
| 7,086,009 B2 | 8/2006 | Resnick et al. | | 2002/0010700 A1 | 1/2002 | Wotring |
| 7,086,042 B2 | 8/2006 | Abe et al. | | 2002/0010743 A1 | 1/2002 | Ryan et al. |
| 7,088,374 B2 | 8/2006 | David et al. | | 2002/0010746 A1 | 1/2002 | Jilk et al. |
| 7,100,147 B2 | 8/2006 | Miller et al. | | 2002/0010855 A1 | 1/2002 | Reshef et al. |
| 7,103,611 B2 | 9/2006 | Murthy et al. | | 2002/0013788 A1 | 1/2002 | Pennell et al. |
| 7,106,888 B1 | 9/2006 | Silverbrook et al. | | 2002/0019941 A1 | 2/2002 | Chan et al. |
| 7,107,282 B1 | 9/2006 | Yalamanchi | | 2002/0023113 A1 | 2/2002 | Hsing et al. |
| 7,107,521 B2 | 9/2006 | Santos | | 2002/0026441 A1 | 2/2002 | Kutay et al. |
| 7,107,539 B2 | 9/2006 | Abbott et al. | | 2002/0026461 A1 | 2/2002 | Kutay et al. |
| 7,120,863 B1 | 10/2006 | Wang | | 2002/0032590 A1 | 3/2002 | Anand et al. |
| 7,124,167 B1 | 10/2006 | Bellotti et al. | | 2002/0032692 A1 | 3/2002 | Suzuki et al. |
| 7,130,885 B2 | 10/2006 | Chandra et al. | | 2002/0032706 A1 | 3/2002 | Perla et al. |
| 7,143,341 B1 | 11/2006 | Kohli | | 2002/0032768 A1 | 3/2002 | Voskuil |
| 7,146,564 B2 | 12/2006 | Kim et al. | | 2002/0035579 A1 | 3/2002 | Wang et al. |
| 7,152,205 B2 | 12/2006 | Day et al. | | 2002/0035581 A1 | 3/2002 | Reynar et al. |
| 7,159,011 B1 | 1/2007 | Knight et al. | | 2002/0040469 A1 | 4/2002 | Pramberger |
| 7,168,035 B1 | 1/2007 | Bell et al. | | 2002/0052769 A1 | 5/2002 | Navani et al. |
| 7,178,166 B1 | 2/2007 | Taylor et al. | | 2002/0053021 A1 | 5/2002 | Rice et al. |
| 7,190,376 B1 | 3/2007 | Tonisson | | 2002/0054126 A1 | 5/2002 | Gamon |
| 7,191,394 B1 | 3/2007 | Ardeleanu et al. | | 2002/0054128 A1 | 5/2002 | Lau et al. |
| 7,200,665 B2 | 4/2007 | Eshghi et al. | | 2002/0057297 A1 | 5/2002 | Grimes et al. |
| 7,200,816 B2 | 4/2007 | Falk et al. | | 2002/0065798 A1 | 5/2002 | Bostleman et al. |
| 7,213,200 B2 | 5/2007 | Abe et al. | | 2002/0065847 A1 | 5/2002 | Furukawa et al. |
| 7,236,982 B2 | 6/2007 | Zlatanov et al. | | 2002/0070973 A1 | 6/2002 | Croley |
| 7,237,114 B1 | 6/2007 | Rosenberg | | 2002/0078074 A1 | 6/2002 | Cho et al. |
| 7,249,328 B1 | 7/2007 | Davis | | 2002/0078103 A1 | 6/2002 | Gorman et al. |
| 7,281,018 B1 | 10/2007 | Begun et al. | | 2002/0083145 A1 | 6/2002 | Perinpanathan |
| 7,281,206 B2 | 10/2007 | Schnelle et al. | | 2002/0083148 A1 | 6/2002 | Shaw et al. |
| 7,281,245 B2 | 10/2007 | Reynar et al. | | 2002/0083318 A1 | 6/2002 | Larose |
| 7,284,208 B2 | 10/2007 | Matthews | | 2002/0091738 A1 | 7/2002 | Rohrabaugh et al. |
| 7,287,218 B1 | 10/2007 | Knotz et al. | | 2002/0099952 A1 | 7/2002 | Lambert et al. |
| 7,296,017 B2 | 11/2007 | Larcheveque et al. | | 2002/0100027 A1 | 7/2002 | Binding et al. |
| 7,313,758 B2 | 12/2007 | Kozlov | | 2002/0107885 A1 | 8/2002 | Brooks et al. |
| 7,316,003 B1 | 1/2008 | Dulepet et al. | | 2002/0111699 A1 | 8/2002 | Melli et al. |
| 7,318,237 B2 | 1/2008 | Moriconi et al. | | 2002/0111932 A1 | 8/2002 | Roberge et al. |
| 7,337,391 B2 | 2/2008 | Clarke et al. | | 2002/0112224 A1 | 8/2002 | Cox |
| 7,337,392 B2 | 2/2008 | Lue | | 2002/0129056 A1 | 9/2002 | Conant |
| 7,346,610 B2 | 3/2008 | Ruthfield et al. | | 2002/0133484 A1 | 9/2002 | Chau et al. |
| 7,346,840 B1 | 3/2008 | Ravishankar et al. | | 2002/0152222 A1 | 10/2002 | Holbrook |
| 7,346,848 B1 | 3/2008 | Ruthfield et al. | | 2002/0152244 A1 | 10/2002 | Dean et al. |
| 7,350,141 B2 | 3/2008 | Kotler et al. | | 2002/0156772 A1 | 10/2002 | Chau et al. |
| 7,370,066 B1 | 5/2008 | Sikchi et al. | | 2002/0156846 A1 | 10/2002 | Rawat et al. |
| 7,373,595 B2 | 5/2008 | Jones et al. | | 2002/0156929 A1 | 10/2002 | Hekmatpour |
| 7,376,673 B1 | 5/2008 | Chalecki et al. | | 2002/0169752 A1 | 11/2002 | Kusama |
| 7,412,649 B2 | 8/2008 | Emek et al. | | 2002/0169789 A1 | 11/2002 | Kutay et al. |
| 7,424,671 B2 | 9/2008 | Elza et al. | | 2002/0174147 A1 | 11/2002 | Wang et al. |
| 7,428,699 B1 | 9/2008 | Kane et al. | | 2002/0174417 A1 | 11/2002 | Sijacic et al. |
| 7,441,200 B2 | 10/2008 | Savage | | 2002/0178187 A1 | 11/2002 | Rasmussen et al. |
| 7,490,109 B1 | 2/2009 | Sikchi et al. | | 2002/0178380 A1 | 11/2002 | Wolf et al. |
| 7,496,632 B2 | 2/2009 | Chapman et al. | | 2002/0184188 A1 | 12/2002 | Mandyam et al. |
| 7,496,837 B1 | 2/2009 | Larcheveque et al. | | 2002/0184219 A1 | 12/2002 | Preisig et al. |
| 7,543,228 B2 | 6/2009 | Kelkar | | 2002/0184401 A1 | 12/2002 | Kadel, Jr. et al. |
| 7,549,115 B2 | 6/2009 | Kotler et al. | | 2002/0184485 A1 | 12/2002 | Dray et al. |
| 7,584,417 B2 | 9/2009 | Friend | | 2002/0188597 A1 | 12/2002 | Kern et al. |
| 7,613,996 B2 | 11/2009 | Dallett et al. | | 2002/0188613 A1 | 12/2002 | Chakraborty et al. |
| 7,673,227 B2 | 3/2010 | Kotler et al. | | 2002/0194219 A1 | 12/2002 | Bradley et al. |
| 7,673,228 B2 | 3/2010 | Kelkar et al. | | 2002/0196281 A1 | 12/2002 | Audleman et al. |
| 7,676,843 B1 | 3/2010 | Stott | | 2002/0196288 A1 | 12/2002 | Emrani |
| 7,692,636 B2 | 4/2010 | Kim | | 2002/0198891 A1 | 12/2002 | Li et al. |
| 7,712,022 B2 | 5/2010 | Smuga | | 2002/0198935 A1 | 12/2002 | Crandall et al. |
| 7,721,190 B2 | 5/2010 | Sikchi | | 2003/0004951 A1 | 1/2003 | Chokshi |
| 7,725,834 B2 | 5/2010 | Bell et al. | | 2003/0007000 A1 | 1/2003 | Carlson et al. |
| 2001/0007109 A1 | 7/2001 | Lange | | 2003/0014397 A1 | 1/2003 | Chau et al. |
| 2001/0016880 A1 | 8/2001 | Cai et al. | | 2003/0018668 A1 | 1/2003 | Britton et al. |
| 2001/0022592 A1 | 9/2001 | Alimpich et al. | | 2003/0020746 A1 | 1/2003 | Chen et al. |
| 2001/0024195 A1 | 9/2001 | Hayakawa | | 2003/0023641 A1 | 1/2003 | Gorman et al. |
| 2001/0037345 A1 | 11/2001 | Kiernan et al. | | 2003/0025693 A1 | 2/2003 | Haley |
| 2001/0044850 A1 | 11/2001 | Raz et al. | | 2003/0025732 A1 | 2/2003 | Prichard |
| 2001/0051928 A1 | 12/2001 | Brody | | 2003/0026507 A1 | 2/2003 | Zlotnick |
| 2001/0054004 A1 | 12/2001 | Powers | | 2003/0028550 A1 | 2/2003 | Lee et al. |
| 2001/0056411 A1 | 12/2001 | Lindskog et al. | | 2003/0033037 A1 | 2/2003 | Yuen et al. |
| 2001/0056429 A1 | 12/2001 | Moore et al. | | 2003/0037303 A1 | 2/2003 | Bodlaender et al. |

| | | |
|---|---|---|
| 2003/0038788 A1 | 2/2003 | Demartines et al. |
| 2003/0038846 A1 | 2/2003 | Hori et al. |
| 2003/0043986 A1 | 3/2003 | Creamer et al. |
| 2003/0046665 A1 | 3/2003 | Ilin |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0055828 A1 | 3/2003 | Koch et al. |
| 2003/0056198 A1 | 3/2003 | Al-Azzawe et al. |
| 2003/0061386 A1 | 3/2003 | Brown et al. |
| 2003/0061567 A1 | 3/2003 | Brown et al. |
| 2003/0069881 A1 | 4/2003 | Huttunen |
| 2003/0074279 A1 | 4/2003 | Viswanath et al. |
| 2003/0084424 A1 | 5/2003 | Reddy et al. |
| 2003/0093755 A1 | 5/2003 | O'Carroll |
| 2003/0110443 A1 | 6/2003 | Yankovich et al. |
| 2003/0120578 A1 | 6/2003 | Newman |
| 2003/0120651 A1 | 6/2003 | Bernstein et al. |
| 2003/0120659 A1 | 6/2003 | Sridhar |
| 2003/0120671 A1 | 6/2003 | Kim et al. |
| 2003/0120686 A1 | 6/2003 | Kim et al. |
| 2003/0126555 A1 | 7/2003 | Aggarwal et al. |
| 2003/0128196 A1 | 7/2003 | Lapstun et al. |
| 2003/0135825 A1 | 7/2003 | Gertner et al. |
| 2003/0140132 A1 | 7/2003 | Champagne et al. |
| 2003/0140160 A1 | 7/2003 | Raz et al. |
| 2003/0142072 A1 | 7/2003 | Lapstun et al. |
| 2003/0149934 A1 | 8/2003 | Worden |
| 2003/0158897 A1 | 8/2003 | Ben-Natan et al. |
| 2003/0163285 A1 | 8/2003 | Nakamura et al. |
| 2003/0167277 A1 | 9/2003 | Hejlsberg et al. |
| 2003/0172113 A1 | 9/2003 | Cameron et al. |
| 2003/0182268 A1 | 9/2003 | Lal |
| 2003/0182327 A1 | 9/2003 | Ramanujam et al. |
| 2003/0187756 A1 | 10/2003 | Klivington et al. |
| 2003/0187930 A1 | 10/2003 | Ghaffar et al. |
| 2003/0188260 A1 | 10/2003 | Jensen et al. |
| 2003/0189593 A1 | 10/2003 | Yarvin |
| 2003/0192008 A1 | 10/2003 | Lee |
| 2003/0200506 A1 | 10/2003 | Abe et al. |
| 2003/0204481 A1 | 10/2003 | Lau |
| 2003/0204511 A1 | 10/2003 | Brundage et al. |
| 2003/0204814 A1 | 10/2003 | Elo et al. |
| 2003/0205615 A1 | 11/2003 | Marappan |
| 2003/0210428 A1 | 11/2003 | Bevlin et al. |
| 2003/0212664 A1 | 11/2003 | Breining et al. |
| 2003/0212902 A1 | 11/2003 | van der Made |
| 2003/0217053 A1 | 11/2003 | Bachman et al. |
| 2003/0218620 A1 | 11/2003 | Lai et al. |
| 2003/0220930 A1 | 11/2003 | Milleker et al. |
| 2003/0225469 A1 | 12/2003 | DeRemer et al. |
| 2003/0225768 A1 | 12/2003 | Chaudhuri et al. |
| 2003/0225829 A1 | 12/2003 | Pena et al. |
| 2003/0226132 A1 | 12/2003 | Tondreau et al. |
| 2003/0233374 A1 | 12/2003 | Spinola et al. |
| 2003/0233644 A1 | 12/2003 | Cohen et al. |
| 2003/0236859 A1 | 12/2003 | Vaschillo et al. |
| 2003/0236903 A1 | 12/2003 | Piotrowski |
| 2003/0237046 A1 | 12/2003 | Parker et al. |
| 2003/0237047 A1 | 12/2003 | Borson |
| 2004/0002939 A1 | 1/2004 | Arora et al. |
| 2004/0002950 A1 | 1/2004 | Brennan et al. |
| 2004/0003031 A1 | 1/2004 | Brown et al. |
| 2004/0003353 A1 | 1/2004 | Rivera et al. |
| 2004/0003389 A1 | 1/2004 | Reynar et al. |
| 2004/0006744 A1 | 1/2004 | Jones et al. |
| 2004/0010752 A1 | 1/2004 | Chan et al. |
| 2004/0015783 A1 | 1/2004 | Lennon et al. |
| 2004/0024842 A1 | 2/2004 | Witt |
| 2004/0030991 A1 | 2/2004 | Hepworth et al. |
| 2004/0039881 A1 | 2/2004 | Shoebridge et al. |
| 2004/0039990 A1 | 2/2004 | Bakar et al. |
| 2004/0039993 A1 | 2/2004 | Kougiouris et al. |
| 2004/0044961 A1 | 3/2004 | Pesenson |
| 2004/0044965 A1 | 3/2004 | Toyama et al. |
| 2004/0046789 A1 | 3/2004 | Inanoria |
| 2004/0054966 A1 | 3/2004 | Busch et al. |
| 2004/0059754 A1 | 3/2004 | Barghout et al. |
| 2004/0073565 A1 | 4/2004 | Kaufman et al. |
| 2004/0073868 A1 | 4/2004 | Easter et al. |
| 2004/0078756 A1 | 4/2004 | Napper et al. |
| 2004/0083426 A1 | 4/2004 | Sahu |
| 2004/0088647 A1 | 5/2004 | Miller et al. |
| 2004/0088652 A1 | 5/2004 | Abe et al. |
| 2004/0093596 A1 | 5/2004 | Koyano |
| 2004/0107367 A1 | 6/2004 | Kisters |
| 2004/0117769 A1 | 6/2004 | Lauzon et al. |
| 2004/0123277 A1 | 6/2004 | Schrader et al. |
| 2004/0139400 A1 | 7/2004 | Allam et al. |
| 2004/0146199 A1 | 7/2004 | Berkner et al. |
| 2004/0148178 A1 | 7/2004 | Brain |
| 2004/0148514 A1 | 7/2004 | Fee et al. |
| 2004/0148571 A1 | 7/2004 | Lue |
| 2004/0162741 A1 | 8/2004 | Flaxer et al. |
| 2004/0163041 A1 | 8/2004 | Engel |
| 2004/0163046 A1 | 8/2004 | Chu et al. |
| 2004/0172442 A1 | 9/2004 | Ripley |
| 2004/0181543 A1 | 9/2004 | Wu et al. |
| 2004/0181711 A1 | 9/2004 | Johnson et al. |
| 2004/0186762 A1 | 9/2004 | Beaven et al. |
| 2004/0189708 A1 | 9/2004 | Larcheveque et al. |
| 2004/0189716 A1 | 9/2004 | Paoli et al. |
| 2004/0194035 A1 | 9/2004 | Chakraborty |
| 2004/0199572 A1 | 10/2004 | Hunt et al. |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler et al. |
| 2004/0205592 A1 | 10/2004 | Huang |
| 2004/0205605 A1 | 10/2004 | Adler et al. |
| 2004/0205644 A1 | 10/2004 | Shaughnessy et al. |
| 2004/0205653 A1 | 10/2004 | Hadfield et al. |
| 2004/0205671 A1 | 10/2004 | Sukehiro et al. |
| 2004/0210599 A1 | 10/2004 | Friedman et al. |
| 2004/0210645 A1 | 10/2004 | Kouznetsov et al. |
| 2004/0216084 A1 | 10/2004 | Brown et al. |
| 2004/0221238 A1 | 11/2004 | Cifra et al. |
| 2004/0221245 A1 | 11/2004 | Chickles et al. |
| 2004/0237030 A1 | 11/2004 | Malkin |
| 2004/0260593 A1 | 12/2004 | Abraham-Fuchs et al. |
| 2004/0261019 A1 | 12/2004 | Imamura et al. |
| 2004/0268229 A1 | 12/2004 | Paoli et al. |
| 2005/0004893 A1 | 1/2005 | Sangroniz |
| 2005/0005248 A1 | 1/2005 | Rockey et al. |
| 2005/0015279 A1 | 1/2005 | Rucker |
| 2005/0015732 A1 | 1/2005 | Vedula et al. |
| 2005/0022115 A1 | 1/2005 | Baumgartner et al. |
| 2005/0027757 A1 | 2/2005 | Kiessig et al. |
| 2005/0028073 A1 | 2/2005 | Henry et al. |
| 2005/0033626 A1 | 2/2005 | Kruse et al. |
| 2005/0033728 A1 | 2/2005 | James |
| 2005/0038711 A1 | 2/2005 | Marlelo |
| 2005/0050066 A1 | 3/2005 | Hughes |
| 2005/0055627 A1 | 3/2005 | Lloyd et al. |
| 2005/0060324 A1 | 3/2005 | Johnson et al. |
| 2005/0060647 A1 | 3/2005 | Doan et al. |
| 2005/0060721 A1 | 3/2005 | Choudhary et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0076049 A1 | 4/2005 | Qubti et al. |
| 2005/0080801 A1 | 4/2005 | Kothandaraman et al. |
| 2005/0091285 A1 | 4/2005 | Krishnan et al. |
| 2005/0091305 A1 | 4/2005 | Lange et al. |
| 2005/0097536 A1 | 5/2005 | Bernstein et al. |

| | | |
|---|---|---|
| 2005/0102370 A1 | 5/2005 | Lin et al. |
| 2005/0102612 A1 | 5/2005 | Allan et al. |
| 2005/0108104 A1 | 5/2005 | Woo |
| 2005/0108624 A1 | 5/2005 | Carrier |
| 2005/0114757 A1 | 5/2005 | Sahota et al. |
| 2005/0114764 A1 | 5/2005 | Gudenkauf et al. |
| 2005/0132043 A1 | 6/2005 | Wang et al. |
| 2005/0132196 A1 | 6/2005 | Dietl |
| 2005/0138031 A1 | 6/2005 | Wefers |
| 2005/0138086 A1 | 6/2005 | Pecht-Seibert |
| 2005/0138539 A1 | 6/2005 | Bravery et al. |
| 2005/0149375 A1 | 7/2005 | Wefers |
| 2005/0149726 A1 | 7/2005 | Joshi et al. |
| 2005/0159136 A1 | 7/2005 | Rouse et al. |
| 2005/0160398 A1 | 7/2005 | Bjornson et al. |
| 2005/0171746 A1 | 8/2005 | Thalhammer-Reyero |
| 2005/0198086 A1 | 9/2005 | Moore et al. |
| 2005/0198125 A1 | 9/2005 | Beck et al. |
| 2005/0198247 A1 | 9/2005 | Perry et al. |
| 2005/0210263 A1 | 9/2005 | Levas et al. |
| 2005/0223063 A1 | 10/2005 | Chang et al. |
| 2005/0223320 A1 | 10/2005 | Brintzenhofe et al. |
| 2005/0234890 A1 | 10/2005 | Enzler et al. |
| 2005/0246304 A1 | 11/2005 | Knight et al. |
| 2005/0257148 A1 | 11/2005 | Goodman et al. |
| 2005/0262112 A1 | 11/2005 | Moore |
| 2005/0268217 A1 | 12/2005 | Garrison |
| 2005/0268222 A1 | 12/2005 | Cheng |
| 2006/0010386 A1 | 1/2006 | Khan |
| 2006/0020586 A1 | 1/2006 | Prompt et al. |
| 2006/0026500 A1 | 2/2006 | Qa 'Im-maqami |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0059107 A1 | 3/2006 | Elmore et al. |
| 2006/0059434 A1 | 3/2006 | Boss et al. |
| 2006/0069605 A1 | 3/2006 | Hatoun |
| 2006/0069985 A1 | 3/2006 | Friedman et al. |
| 2006/0075245 A1 | 4/2006 | Meier |
| 2006/0080657 A1 | 4/2006 | Goodman |
| 2006/0085409 A1 | 4/2006 | Rys et al. |
| 2006/0101037 A1 | 5/2006 | Brill et al. |
| 2006/0101051 A1 | 5/2006 | Carr et al. |
| 2006/0107206 A1 | 5/2006 | Koskimies |
| 2006/0129583 A1 | 6/2006 | Catorcini et al. |
| 2006/0129978 A1 | 6/2006 | Abrari et al. |
| 2006/0136422 A1 | 6/2006 | Matveief et al. |
| 2006/0143220 A1 | 6/2006 | Spencer, Jr. |
| 2006/0155857 A1 | 7/2006 | Feenan et al. |
| 2006/0161559 A1 | 7/2006 | Bordawekar et al. |
| 2006/0161837 A1 | 7/2006 | Kelkar et al. |
| 2006/0173865 A1 | 8/2006 | Fong |
| 2006/0184393 A1 | 8/2006 | Ewin et al. |
| 2006/0195413 A1 | 8/2006 | Davis et al. |
| 2006/0200754 A1 | 9/2006 | Kablesh et al. |
| 2006/0230363 A1 | 10/2006 | Rapp |
| 2006/0248468 A1 | 11/2006 | Constantine et al. |
| 2007/0005611 A1 | 1/2007 | Takasugi et al. |
| 2007/0036433 A1 | 2/2007 | Teutsch |
| 2007/0050719 A1 | 3/2007 | Lui et al. |
| 2007/0061467 A1 | 3/2007 | Essey |
| 2007/0061706 A1 | 3/2007 | Cupala |
| 2007/0088554 A1 | 4/2007 | Harb et al. |
| 2007/0094589 A1 | 4/2007 | Paoli |
| 2007/0100877 A1 | 5/2007 | Paoli |
| 2007/0101280 A1 | 5/2007 | Paoli |
| 2007/0118538 A1 | 5/2007 | Ahern et al. |
| 2007/0118803 A1 | 5/2007 | Walker et al. |
| 2007/0130500 A1 | 6/2007 | Rivers-Moore et al. |
| 2007/0130504 A1 | 6/2007 | Betancourt et al. |
| 2007/0186157 A1 | 8/2007 | Walker et al. |
| 2007/0208606 A1 | 9/2007 | MacKay et al. |
| 2007/0208769 A1 | 9/2007 | Boehm et al. |
| 2007/0276768 A1 | 11/2007 | Pallante |
| 2008/0021916 A1 | 1/2008 | Schnelle et al. |
| 2008/0028340 A1 | 1/2008 | Davis |
| 2008/0052287 A1 | 2/2008 | Stanciu |
| 2008/0126402 A1 | 5/2008 | Sikchi et al. |
| 2008/0134162 A1 | 6/2008 | James et al. |
| 2009/0070411 A1 | 3/2009 | Chang et al. |
| 2009/0119580 A1 | 5/2009 | Rohrabaugh et al. |
| 2009/0138389 A1 | 5/2009 | Barthel |
| 2009/0177961 A1 | 7/2009 | Fortini |
| 2010/0125788 A1 | 5/2010 | Kelkar |

FOREIGN PATENT DOCUMENTS

| | | |
|---|---|---|
| EP | 0841615 A2 | 11/1999 |
| EP | 0961197 | 12/1999 |
| EP | 1076290 | 2/2001 |
| EP | 1076290 A2 | 2/2001 |
| EP | 1221661 | 7/2002 |
| JP | 63085960 | 4/1988 |
| JP | 401173140 | 7/1989 |
| JP | 401173140 A | 7/1989 |
| JP | 3191429 | 8/1991 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 10171662 | 6/1998 |
| JP | 10-2207805 | 8/1998 |
| JP | 10207805 | 8/1998 |
| JP | 3191429 | 1/2000 |
| JP | 200132436 | 5/2000 |
| JP | 2000132436 | 5/2000 |
| JP | 2002183652 | 6/2002 |
| JP | 2003173288 | 6/2003 |
| WO | WO-9924945 | 5/1999 |
| WO | WO9924945 | 5/1999 |
| WO | WO9956207 | 11/1999 |
| WO | WO-9956207 | 11/1999 |
| WO | WO-0144934 | 6/2001 |
| WO | WO0144934 A1 | 6/2001 |
| WO | WO0157720 | 8/2001 |

OTHER PUBLICATIONS

"XML Forms Architecture (XFA)", Retrieved from http://xml.coverpages.org/xfa.html on Aug. 17, 2006, Cover Pages Technology Reports,,(Jun. 16, 1999),p. 1.

Bray, Tim "Extensible Markup Langage (XML)", http://www.textuality.com/sgml-erb/WD-xml.html, second named inventor Jean Paoli, third named inventor C.M. Sperberg-McQueen,(Feb. 10, 1998),37 pages.

Bradley, Neil "The XML Companion, Third Edition", Published by Addison Wesley Professional, http://proquest.safaribooksonline.com0201770598, http,(Dec. 12, 2001), 1-18.

Klarlund, Nils "DSD: A Schema Language for XML", *ACM*, FSMP Portland Oregon, (2000),101-111.

Watt, Andrew "Microsoft Office Infopath 2003 Kick Start", (Published by Sams) Print ISBN-10:0-672-32623-X, (Mar. 24, 2004), 1-57.

Hu, et al., "A Programmable Editor for Developing Structured Documents based on Bidirectional Transformations", ACM,(Aug. 2004),178-179.

Kay, Michael "XSL Transfornmations (XSLT) Version 2.0", http://www.w3.org/TR/2005/WD-xsit20-20050404, (04/205),1-374.

"Non Final OA", U.S. Appl. No. 10/939,588, (Feb. 18, 2009),40 pages.

"Notice of Allowance", U.S. Appl. No. 10/404,312, (Jan. 12, 2009),12 pages.

"Final Office Action", U.S. Appl. No. 10/857,689, (Jan. 6, 2009),23 pages.

"Non Final Office Action", U.S. Appl. No. 10/977,198, (Feb. 2, 2009),15 pages.
"Non Final Office Action", U.S. Appl. No. 10/939,588, (Feb. 18, 2009),40 pages.
"Non Final Office Action", U.S. Appl. No. 10/976,451, (Feb. 23, 2009),39 pages.
"Non final Office Action", U.S. Appl. No. 11/234,767, (Feb. 26, 2009),37 pages.
"Notice of Allowance", U.S. Appl. No. 11/167,514, (Mar. 11, 2009),6 pages.
"Non Final Office Action", U.S. Appl. No. 10/942,528, (Mar. 6, 2009),31 pages.
"Non Final Offfice Action", U.S. Appl. No. 11/170,521, (Jan. 21, 2009),86 pages.
"Foreign Office Action", Application No. 2,412,611 (Feb. 9, 2009),6 pages.
"Foreign Office Action", Application Serial No. 200610003709.2, (Jan. 9, 2009),8 pages.
"EP Office Action", Application Serial No. 06111546.5, (Oct. 15, 2008),5 pages.
"Notice of Re-Examination", Application Serial No. 01813138.7, (Mar. 11, 2009),27 pages.
"Final Office Action", U.S. Appl. No. 11/107,347, (Apr. 2, 2009),15 pages.
"Restriction Requirement", U.S. Appl. No. 11/227,550, (Apr. 2, 2009),8 pages.
"Non Final Office Action", U.S. Appl. No. 10/955,665, (Apr. 2, 2009),19 pages.
"Non Final Office Action", U.S. Appl. No. 10/988,720, 19 pages.
"Final Office Action", U.S. Appl. No. 11/203,818, (Apr. 14, 2009),31 pages.
"Final Office Action", U.S. Appl. No. 11/044,106, (Apr. 13, 2009),20 pages.
"Final Office Action", U.S. Appl. No. 11/226,044, (Apr. 20, 2009),24 pages.
"Final Office Action", U.S. Appl. No. 11/056,500, (Apr. 16, 1009),10 pages.
"Microsoft Visual Basic 5.0 Programmer's Guide", *Microsoft Press*, (1997),pp. 42-43, 54-58.
"Microsoft Word 2000", Screenshots,(1999),1-5.
Borland, Russo , "Running Microsoft Word 97", 314-315,338, 361-362, 390, and 714-719.
Hall, Richard S., "Agent-based Software Configuration and Development", http://www.doc.ic.ac.uk/~alw/edu/theses/hall-phd-0599.pdf on Jun. 8, 2009, Thesis of the University of Colorado,(May 1, 1999),182 pages.
Acklen, et al., "Using Corel Wordperfect 9", Que Corporation,,(1998),pp. 251-284, 424-434, 583-585.
"Final Office Action", U.S. Appl. No. 11/203,937, (May 7, 2009),13 pages.
"Non Final Office Action", U.S. Appl. No. 10/955,666, (May 7, 2009),28 pages.
"Non Final Office Action", U.S. Appl. No. 10/876,433, (Apr. 24, 2009),62 pages.
"Non Final Office Action", U.S. Appl. No. 10/916,692, (Apr. 30, 2009),14 pages.
"HP Blade Sever BH Series Operating System Guide", Hewlett-Packard,(Jul. 2002).
"Non Final Office Action", U.S. Appl. No. 09/599,809, (May 13, 2009),25 pages.
"Non Final Office Action", U.S. Appl. No. 11/295,178, (May 27, 2009),111 pages.
"Non Final Office Action", U.S. Appl. No. 10/990,152, (May 28, 2009),19 pages.
"Final Office Action", U.S. Appl. No. 11/036,910, (Jun. 1, 2009),15 pages.
"Non Final Office Action", U.S. Appl. No. 10/857,689, (Jun. 11, 2009),25 pages.
"Non Final Office Action", U.S. Appl. No. 11/095,254, (Jun. 8, 2009),21 pages.
"Final Office Action", U.S. Appl. No. 11/234,767, (Jun. 10, 2009),24 pages.

"Foreign Office Action", Application Serial No. 2002-503702, Final Notice of Rejection,(Jun. 5, 2009),212 pages.
Kaori, Iwantani et al., "Perfect Manual of Clarisworks 4.0 for Macintosh", 1st Edition, Japan,(07/297),pp. 153-167.
Noriko, Matsushita "Step-up Training of Clarisworks (tabulation), Successful Use of Spreadsheet and Tabulation", Mac People, vol. 4, No. 19,(Oct. 1, 1998),pp. 138-139.
Akihiro, Senda "Word 2000, Conservative-Looking but 'Attentive' New Function", Nikkei PC 21, vol. 4, No. 8,(Aug. 1, 1999),pp. 115-116.
Yasuji, Fukuhara "Clarisworks, Introduction to Business Document Construction, No. 4, Estimate", Nikkei Mac, No. 14,(May 17, 1994),pp. 197-204.
U.S. Appl. No. 60/19,1662, filed Jan. 1, 2000.
U.S. Appl. No. 60/203,061, filed Jan. 1, 2000, Ben-Natan et al.
U.S. Appl. No. 60/209,713, filed Jan. 1, 2000, Kutay et al.
Acklen et al., "Using Corel Wordperfect 9", 251-284, 424-434, 583-586 (1998).
"Architecture for a Dynamic Information Area Control" IBM Technical Disclosure Bulletin IBM Corp. New York US vol. 37, No. 10 Jan. 10, 1994, pp. 245-246.
Au et al., "Netscape Communicator's Collapsible Toolbars" CHI'98 Human Factors in Computing Systems Conference Proceedings Los Angeles CA Apr. 18-23, 1998 pp. 81-86.
Barker at al., "Creating In-Line Objects Within An Itegrated Editing Environment" IBM Technical Disclosure Bulletin vol. 27 No. 5 Oct. 1984 p. 2962.
Battle et al., "Flexible Information Presentation with XML" 1998 The Institution of Electrical Engineers 6 pages.
Berg, "Naming and Binding: Monikers" Inside Ole 1995 Chapter 9 pp. 431-490.
Chen et al., "XKvaildator: A Constraint Validator for XML" CIKM '-2 Nov. 4-9, 2002 Copyright 2002 ACM 1-58113-492-4/02/0022 pp. 446-452.
Cheng et al., "Desiging Valid XML Views" ER 2002 LNCS 2503 2002 Springer-Verlag Berlin Heidelberg 2002 pp. 463-477.
Chien et al., "Efficient Management of Multiversion Documents by Object Referencing" Proceedings of the 27th VLDB Conference 2001 pp. 291-300.
Chien, et al., "Efficient schemes for managing mulitversion XML documents" VLDB Journal (2002) pp. 332-352.
Chien at al. "Storing and Querying Multiversion XML Documents using Durable Node Numbers" IEEE 2002 pp. 232-241.
Chien et al., "XML Document Versioning" SIGMOD Record vol. 30 No. 3 Sep. 2001 pp. 46-53.
Chuang, "Generic Validation of Structural Content with Parametric Modules" ICFP '01 Sep. 3-5, 2001 Copyright 2001 ACM 1-58113-415-0/01/0009 pp. 98-109.
Ciancarini, et al., "Managing Complex Documents Over the WWW: A Case Study for XML" IEEE Transactions on Knowledge and Data Engineering vo.l. 11 No. 4 Jul./Aug. 1999. pp. 629-938.
Clapp, "The NeXT Application Kit Part I: Non-Responsive Classes" The NeXT Bible 1990 Chapter 16 pp. 275-293.
Clark, at al., "XML Path Language (XPath) Version 1.0" Nov. 16, 1999W3C (MIT INRIA Kejo) pp. 1-49.
Clark, "XSL Transformation (XSLT) Verison 1.0" Nov. 16, 1999 W3C (MIT INRIA Kejo) pp. 1-156.
Clarke, "From small beginnings" Knowledge Management Nov. 2001 pp. 28-30.
Cybook, Inc.: "Copying the Search Form to Services-based Web Sites" INternet Article, (online) Jul. 26, 2004.
Dayton at al., "Photo Shop 5/5.5 WOW! Book" 2000 Peachpit Press pp. 8-17.
Description of Whitehill Composer software product producted by Whitehill Technologies Inc. available at [http://www.xml.com/pub/p/221] accessed on Apr. 8, 2004 two pages.
DiLascia, et al., "Sweeper" Microsoft Interactive Developer vol. 1 No. 1 1996 27 pages.
Dyck, "XML Spy Tops as XML Editor" http://www.eweek.com/article2/0395972404100.asp Nov. 25, 2002 4 pages.
Excel Developer Tip (hereinafter "Excel"), "Determining the Data Type of a Cell", May 13, 1998, p. 1 (available at http://jwalk.com/ss//excel/tips/tip62.htm).

Bruce Halberg et al, "Using Microsoft Excel 97", Published 1997, Bestseller Edition, Pertinent pp. 1-9, 18-25, 85-89, 98-101,106-113, 124-127, 144-147, 190-121, 209-210, 218-227, 581-590, 632-633, 650-655, 712-714.

Hall, "Agent-based Software Configuration and Deployment" Thesis of the University of Colorado Online Dec. 31, 1999 retrieved from the Internet on Nov. 7, 2003: [http://www.cs.colorado.edu/users/rickhall/documents/ThesisFinal.pdf] 169 pages.

Han et al., WebSplitter. A Unified XML Framework for Multi-Device Collaborative Web Browsing, 2000, ACM Conference on Cimputer Supported Cooperative Work, 10 pages.

Hardy et al., "Mapping and Displaying Structural Transformations between XML and PDF" DocEng '02 Nov. 8-9, 2002 Copyright 2002 ACM 1-58113-597-7/02/0011 pp. 95-102.

Herzner, et al., "CDAM—Compound Document Access and Management. An Object-Oriented Approach" Multimedia Systems Interaction and Applications 1992 Chapter 3 pp. 17-36.

Hwang at al., "Micro-Firewalls for Dynamic Network Security with Distributed Intrusion Detection"; IEEE INternational Symposium on Network Computing and Applications; 2001; pp. 68-79.

Kaiya et al., "Specifying Runtime Environments and Functionalities of Downloadable Components Under the Sandbox Mode"; International Symposium on Principles of Software Evolution; 2000; pp. 138-142.

Kanemoto, et al., "An Efficiently Updatable Index Scheme for Structured Documents" 1998 IEEE pp. 991-996.

Kim, et al., "Immediate and Partial Validation Mechanism for the Conflict Resolution of Update Operations in XML Databases" WAIM 2002 LNCS 2419 2002 pp. 387-396 Springer-Verlag Berlin Heidelberg 2002.

Kobayashi, et al., "An Update on BTRON-specification OS Development" IEEE 1991 pp. 132-140.

Komatsu, et al., "A Proposal on Digital Watermark in Document Image Communication and Its Application to Realizing a Signature" Electronics and Communications in Japan Part I: Communications vol. 73 No. 5 May 1990 pp. 22-33.

LeBlond et al, "PC Magazine Guide to Quattro Pro for Windows", pp. 9-11, 42-61, Ziff-Davis Press, Copyright 1993 by the LeBlond Group.

Macromedia, Inc.: "Dreamweaver Technote, Changes in copying and pasting in Dreamweaver 4" Internet Article (online).

Mansfield, "Excel 97 for Busy People", Published by Osborne/Mcgraw-Hill 1997 pp. 48-50.

McCright, "New Tool Kit to Link Groove with Microsoft Sharepoint" eWeek Enterprise News & Reviews Ziff Davis Media INc. Jul. 29, 2002 1 page.

"Microsoft Visual Basic 5.0 Programmer's Guide 1997"; pp. 578-579; Redmond WA 98052-6399.

Microsoft Word 2000 (see Screen Shot "About Microsoft Word") Published 1983-1999 and Microsoft Excel 2000 (see Screen Shot "About Microsoft Excel") Published 1988-1999, Three pages.

Musgrave, "Networking technology—impact and opportunities" Survey and Statistical Computing 1996. Proceedings of the Second ASC International Conference. Sep. 1996. pp. 369-378. London UK Nelson, "Validation with MSXML and XML Schema" Windows Developer Magazine Jan. 2002 pp. 35-38.

Noore, "A secure conditional access system using digital signature and encryption" 2003 Digest of Technical Papers International Conference on Consumer Electronics Jun. 2003 pp. 220-221.

Pacheco, et al., "Delphi 5 Developer's Guide" Sams Publishing 1999 Chapter 31 Section: Data Streaming 6 pages.

Peterson, "Unix Variants" Unix Review vol. 10 No. 4 Apr. 1992 pp. 29-31.

Pike et al., "Plan 9 from Bell Labs"UKUUG Summer 1990 10 pages.

Pike et al,; "The Use of Name Spaces in Plan 9," Operating Systems Review, vol. 27, No. 2, Apr. 1993, pp. 72-76.

Prevelakis, et al., "Sandboxing Applications"; Proceedings of the FREENIX Track; 2001; pp. 119-126.

Redo, "How to create a template that makes it easy for users to "fill in the blanks", without doing any programming" Microsoft Word MVP FAQ Site, (online) Apr. 30, 2004, the whole document.

Rapaport, "Get more from SharePoint" Transform Magazine vol. 11 No. 3. Mar. 2002 pp. 1315.

Rogge at al., "Validating MPEG-21 Encapsulated Functional Metadata" IEEE 2002 pp. 209-212.

Schmid, et al., "Protection Data from Malicious Software"; 18th Annual Computer Security Applications Conference; 2002; pp. 199-208.

"SmartUpdate Developer's Guide" Online Mar. 11, 1999 retrieved from the Internet on Dec. 8, 2000: [http://developer.netscape.com:80/docs/manuals/communicator/jarman/index.htm] 83 pages.

IBM: Stack Algorithm for Extractin Subtree from Serialized Tree, Mar. 1, 1994, TDB-ACC-NONN94033, 3 pages.

Staneck, "Internal and External Media" Electronic Publishing Unleashed 1995 Chapter 22 pp. 510-542.

"Store and Organize Related Project Files in a Binder" Getting Results with Microsoft Office 1990 pp. 109-112.

Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.

Tomimori et al., "An Efficient and Flexible Access Control Framework for Java Programs in Mobile Terminals"; 22nd International Conference on Distributed Computing Systems Workshops; 2002; pp. 777-782.

Trupin, "The Visual Programmer" Microsoft Systems Journal Apr. 1996 pp. 103-105.

Usdin et al., "XML: Not a Silver Bullet But a Great Pipe Wrench" Standardview vol. 6. No. 3 Sep. 1998 pp. 125-132.

Altova, "User Reference manual Version 4.4, XML Spy suite 4.4," Altova Ges.m.b.H and Altova, Inc., May 24, 2002, pages cover, copyright p. 1-565.

Van Hoff, et al., "The Open Software Description Format" Online Aug. 13, 1997 retrieved from the Internet on Nov. 7, 2003: [http://www.w3.org/TR/NOTEe-OSD] 11 pages.

Varlamis, at al., "Bridging XML-Schema and relational databases. A System for generating and manipulating relational databases using valid XML documents." DocEng '01 Nov. 9-10, 2001 Coppyright 2001 ACM 1-58113-432-0/01/0011 pp. 105-114.

"Whitehill Composer" Whitehill Technologies Inc. 2 pages.

Williams, et al., "The Component Object Model A Technical Overview" Oct. 1994 Microsoft Corp. pp. 1-14.

Wong, at al., "Managing and Querying Multi-Version XML Data with Update Logging" DocEng '02 Nov. 8-9, 2002 Copyright 2002 ACM 1-58113-594-7/02/0011 pp. 74-81.

Altova, Inc., "XML Spy 4.0 Manual," Altova Inc. & Altova GmbH, coyright 1998-2001, Chapters 1, 2, and 6, encompassing pp. 1-17, 18-90, and 343-362.

Altova, XML Spy, XML integrated Development Environments, Altova Inc., 2002, pp. 1-18.

Zdonik, "Object Management System Concepts" ACM 1984 pp. 13-19.

XmlSpy, "XmlSpy 2004 Enterprise Edition Manual", Altova,(May 17, 2004),1-25, 220-225.

StylusStudio, "StylusStudio: XPath Tools", 2004-2007, StylusStudio,1-14.

Dodds, "Toward an XPath API", xml.com,(May 7, 2001),1-3.

Altova, "Altova Tools for XPath 1.0/2.0", Altova,1-12.

"Microsoft Word 2000 Screenshots", Word,(2000),1-17.

Grosso, et al., "XML Fragment Interchange", W3C,(Feb. 2001),1-28.

Altova, et al., "User and Reference Manual Version 4.4", www.xmlspy.com, (May 24, 2007), 1-565.

"XForm 1.0", W3C,(Jul. 16, 2001).

"Microsoft Word 2000 Screenshots", (2000),11-17.

Van Hoff, Arthur et al., "The Open Software Description Format", Retrieved from: <www.w3.org/TR/NOTE-OSD> on Nov. 7, 2003, (Aug. 13, 1997),11 pages.

"Notice of Allowance", U.S. Appl. No. 11/203,937, Supplemental, (Sep. 15, 2009),2 pages.

"Final Office Action", U.S. Appl. No. 10/942,528, (Sep. 17, 2009),27 pages.

"Non-Final Office Action", U.S. Appl. No. 11/107,347, (Sep. 17, 2009),9 pages.

"Notice of Allowance", U.S. Appl. No. 10/988,720, (Sep. 17, 2009),18 pages.

"Non-Final Office Action", U.S. Appl. No. 11/044,106, (Sep. 24, 2009),17 pages.
"Notice of Allowance", U.S. Appl. No. 11/203,937, (Aug. 31, 2009),2 pages.
"Non-Final Office Action", U.S. Appl. No. 11/567,149, (Sep. 8, 2009),5 pages.
"Final Office Action", U.S. Appl. No. 10/955,666, (Oct. 14, 2009),24 pages.
"Advisory Action", U.S. Appl. No. 10/942,528, (Oct. 26, 2009),3 pages.
"Non-Final Office Action", U.S. Appl. No. 10/976,451, (Oct. 29, 2009),14 pages.
Webopedia, "Definition of Ole", Retrieved from: <http://www.webopedia.com/TERM/O/OLE.html>,(May 16, 1998),3 pages.
Webopedia, "Definition of OpenDoc", Retrieved from: <http://www.webopedia.com/TERM/O/OpenDoc.html>,(Sep. 1, 1996),3 pages.
Webopedia, "Definition of Network", Retrieved from: <http://www.webopedia.com/TERM/n/network.html>,(Sep. 1, 1996),2 pages.
"Notice of Allowance", U.S. Appl. No. 10/955,665, (Nov. 3, 2009),8 pages.
"Final Office Action", U.S. Appl. No. 10/916,692, (Nov. 16, 2009),10 pages.
"Final Office Action", U.S. Appl. No. 11/218,149, (Nov. 16, 2009),18 pages.
"Final Office Action", U.S. Appl. No. 11/072,087, (Nov. 16, 2009),9 pages.
"Non-Final Office Action", U.S. Appl. No. 11/036,910, (Nov. 13, 2009),9 pages.
"Notice of Allowance", U.S. Appl. No. 11/095,254, (Nov. 18, 2009),8 pages.
"Foreign Office Action", Mexican Patent Application No. PA/a/2006/002493, (Sep. 14, 2009),3 pages.
Beauchemin, Dave "Using InfoPath to Create Smart Forms", Retrieved from: <http:/www.microsoft.com/office/infopath/prodinfo/using.mspx> on Jan. 21, 2007, (Mar. 27, 2003),6 pages.
Begun, Andrew et al., "Support and Troubleshooting for XML Schemas in InfoPath 2003", Retrieved from: <http://msdn2.microsoft.com/en-us/library/aa168241(office.11,d=printer).aspx> on Jan. 21, 2007, Microsoft Office InfoPath 2003 Technical Articles,(Aug. 2004),12 pages.
Dubinko, Micah "XForms and Microsoft InfoPath", Retrieved from: <http://www.xml.com/lpt/a/1311> on Jan. 21, 2007, (Oct. 29, 2003),6 pages.
Udell, Jon "InfoPath and XForms", Retrieved from: <http://weblog.infoworld.com/udell/2003/02/26.html> on Jan. 21, 2007, (Feb. 26, 2003),3 pages.
Hoffman, Michael "Architecture of Microsoft Office InfoPath 2003", Retrieved from: <http://msdn2.microsoft.com/en-us/library/aa219024(office.11,d=printer).aspx> on Jan. 27, 2007, Microsoft Office Info Path 2003 Technical Articles,(Jun. 2003),18 pages.
Singh, Darshan "Microsoft InfoPath 2003 By Example", Retrieved from: <http://www.perfectxml.com/InfoPath.asp> on Jan. 21, 2007, (Apr. 20, 2003),19 pages.
Raman, T. V., et al., "XForms 1.0", Retrieved from: <file://M:\MS\Files\MS307986.01\DOCS\OA1 Docs\Raman.htm> on May 22, 2007, (Dec. 7, 2001),64 pages, Section 1-12.2.3 & Appendices A-G.
"Enter Key ", Retrieved from: <http://systems.webopedia.com/TERM/Enter_key.html> on Dec. 20, 2006, (Sep. 1, 1996),1 page.
Lehtonen, Miro et al., "A Dynamic User Interface for Document Assembly", Department of Computer Science, Univerisity of Helsinki,(Nov. 2002),pp. 134-141.
Rees, Michael J., "Evolving the Browser Towards a Standard User Interface Architecture", School of Information Technology, Bond University, Australia,(2001),pp. 1-7.
Nelson, Joe "Client-side Form Validation Using JavaScript", *Developer Advisory*, (Sep. 21, 2001),pp. 1-9.
"OMG XML Metadata Interchange (XML) Specification", Retrieved from: <http://www.omg.org/cgi-bin/doc?formal/02-01-01.pdf> on Dec. 2, 2009, Version 1.2, (Jan. 2002),268 pages.
Sun, Q et al., "A Robust and Secure Media Signature Scheme for JPEG Images", Proceeding of 2002 IEEE Workshop on Multimedia Signal Processing,(Dec. 2002),pp. 296-299.

Sutanthavibul, Supoj et al., "XFIG Version 3.2 Patchlevel 2 (Jul. 2, 1998) Users Manual (Edition 1.0)", Retrieved from:<www.ice.mtu.edu/online_docs/sfig332/> on Jan. 28, 2003, Internet Document XP002229137,(Jul. 2, 1998),60 pages.
"Netscape Communicator 4.61 for OS/2 Warp", Netscape Communication Corporation, Software 1999, The Whole software release & Netscape—Version 4.61 {en}-010615, Netscape Screenshot,(Oct. 2, 2002),1 page.
Alschuler, Liora "A Tour of XMetal", Retrieved from: <http://www.xml.com/pub/a/SeyboldReport/ip031102.html> on Feb. 5, 2003, XML.com, Online!XPOO2230081,(Jul. 14, 1999),3 pages.
Davidow, Ari "XML Editors: Allegations of Functionality in Search of Reality", Retrieved from: <http://www.ivritype.com/xml/> on Feb. 9, 2009,SP002230082,(Oct. 12, 1999),16 pages.
Brogden, William "Arbortext Adept 8 Editor Review", Retrieved from: <www.xml.com/pub/a/1999/09/adept/AdeptRvw.htm> on Feb. 5, 2003, O'Reilly XML.COM, Online!,(Sep. 22, 1999),4 pages.
Haukeland, Jan-Henrick "Tsbiff-tildeslash biff—Version 1.2.1", http://web.archive.org/web/19990912001527/http://www.tildeslash.com/tsbiff/.,(Jun. 1999),2 pages.
Ben-Natan, Ron et al., "Internet Platform for Creating and Supporting Communities", U.S. Appl. No. 60/203,081, filed May 9, 2000,31 pages.
"Notice of Allowance", U.S. Appl. No. 10/988,718, (Apr. 9, 2009),17 pages.
Reagan, Moore W., et al., "Collection-Based Persistent Digital Archives", U.S. Appl. No. 60/191,662, filed Mar. 23, 2000,133 pages.
Kutay, Ali et al., "Methods and Systems for Accessing, Organizing, Presenting and Viewing Data", U.S. Appl. No. 60/209,713, Kutay et al., filed Jun. 5, 2000,345 pages.
"Architecture for a Dynamic Information Area Control", IBM Technical Disclosure Bulletin, IBM Corp, NY, US vol. 37, No. 10, Jan. 10, 1994,pp. 245-246.
"Copying the Search Form to Custom Pages in Windows SharePoint Services-based Web Sites", Retrieved from <www.sharepointcustomization.com/resources/tipstricks/04wss-searchbox-tip.htm> (Feb. 11, 2009), Microsoft Corp,(2003),1 page.
"Excel Developer Tip: Determining the Data Type of a Cell", Retrieved from <http://jwalk.com/ss/excel/tips/tip62.htm>, (May 13, 1998),1 page.
"Final Office Action", U.S. Appl. No. 11/227,550, (Jan. 19, 2010),12 pages.
"Final Office Action", U.S. Appl. No. 11/234,767, (Jan. 26, 2010),23 pages.
"Final Office Action", U.S. Appl. No. 11/295,178, (Dec. 24, 2009),38 pages.
"Foreign Notice of Allowance", Mexican Application No. PA/a/2005/012067, (Nov. 13, 2009),3 pages.
"Foreign Office Action", Application Serial No. 200610051544.X, (Dec. 4, 2009),9 pages.
"Non-Final Office Action", U.S. Appl. No. 10/402,640, (Dec. 30, 2009),16 pages.
"Non-Final Office Action", U.S. Appl. No. 11/170,521, (Dec. 17, 2009),11 pages.
"Non-Final Office Action", U.S. Appl. No. 11/218,149, (Jan. 14, 2010),15 pages.
"Non-Final Office Action", U.S. Appl. No. 11/227,550, (Mar. 10, 2010),12 pages.
"Non-Final Office Action", U.S. Appl. No. 12/021,894, (Dec. 31, 2009),10 pages.
"Notice of Allowance", U.S. Appl. No. 10/942,528, (Dec. 3, 2009),8 pages.
"Notice of Allowance", U.S. Appl. No. 10/990,152, (Dec. 21, 2009),6 pages.
"Notice of Allowance", U.S. Appl. No. 11/056,500, (Dec. 2, 2009),17 pages.
"Notice of Allowance", U.S. Appl. No. 11/072,087, (Feb. 23, 2010),4 pages.
"Notice of Allowance", U.S. Appl. No. 11/872,703, (Jan. 27, 2010),19 pages.
"Notice of Allowance", U.S. Appl. No. 110/93,588, (Mar. 10, 2010),10 pages.

"SmartUpdate Developer's Guide", Retrieved from http://developer.netscapte.com:80/docs/manuals/communicator/jarman/index.htm on Dec. 8, 2000, Netscape Communications Corp,(Mar. 11, 1999),83 pages.

"Stack Algorithm for Extracting Subtree from Serialized Tree", *IBM Technical Disclosure Bulletin*, TDB-ACC-NO; NN94033, (Mar. 1, 1994),2 pages.

"Store and Organize Related Project Files in a Binder", Getting results with Microsoft Office,(1990),pp. 109-112.

"Streamlining Content Creation", Ixia Soft Jun. 6, 2002, pp. 1-16.

"Supplemental Notice of Allowance", U.S. Appl. No. 10/955,665, (Dec. 30, 2009),2 pages.

"Supplemental Notice of Allowance", U.S. Appl. No. 10/955,665, (Feb. 4, 2010),2 pages.

"Supplemental Notice of Allowance", U.S. Appl. No. 10/955,665, (Nov. 27, 2009),2 pages.

"Supplemental Notice of Allowance", U.S. Appl. No. 10/955,665, (Mar. 5, 2010),2 pages.

"Validation with MSXML and XML Schema", *Windows Developer Magazine*, (Jan. 1, 2002),5 pages.

"Whitehill Composer Software product", Retrieved from www.xml.com/pub/p/221 on Apr. 8, 2004, Whitehill Technologies Inc., (Apr. 8, 2004),2 pages.

Altova, "XML Spy 4.0 Manual", *1998-2001 Altova Inc. & Altova GmbH*, (Nov. 10, 2001), pp. 1-90, 343-362.

Altova, et al., "XML Spy, XML Integrated Development Environments", Altova Inc.,(2002),pp. 1-18.

Au, Irene et al., "Netscape Communicator's Collapsible Toolbars", CHI 98, Human Factors in Computing Systems, Conference Proceedings, LA, CA, (Apr. 18-23, 1998),pp. 81-86.

Barker, et al., "Creating In-Line Objects Within An Integrated Editing Environment", IBM Technical Disclosure Bulletin, vol. 27, No. 5, (Oct. 1984), p. 2962.

Battle, Steven A., et al., "Flexible Information Presentation with XML", *The Institution of Electrical Engineers*, (1998),6 pages.

Berg, A "Naming and Binding: Monikers", *Inside OLE*, Chapter 9, Harmony Books, (1995),pp. 431-490.

Chen, Ya B., et al., "Designing Valid XML Views", S. Spaccapietra, S.T. March, and Y. Kambayashi (Eds.): ER 2002, *LNCS 2503*, Copyright: Springer-Verlag Berlin Heidelberg 2002,pp. 463-477.

Chen, Yi et al., "XKvalidator: A Constraint Validator for XML", *CIKM '02*, Nov. 4-9, 2002, McLean, VA, USA, Copyright 2002, ACM, ISBN 1-58113-492-4/02/0011,pp. 446-452.

Chien, et al., "Efficient Management of Multiversion Documents by Object Referencing", Proceedings of the 27th VLDB Conference,(2001),pp. 291-300.

Chien, Shu-Yao et al., "Efficient Schemes for Managing Multiversion XML Documents", *The VLDB Journal 2002*, (Dec. 19, 2002),pp. 332-353.

Chien, Shu-Yao et al., "Storing and Querying Multiversion XML Documents using Durable Node Numbers", IEEE,(2002),pp. 232-241.

Chien, Shu-Yoa et al., "XML Document Versioning", SIGMOD Record, vol. 30, No. 3,,(Sep. 2001),pp. 46-53.

Chuang, Tyng-Ruey "Generic Validation of Sturctural Content with Parametric Modules", *ICFP 2001 International Conference on Functional Programming*, vol. 36, No. 10, Available at <http://citeseerx.ist.psu.edu/viewdoc/download?doi=10.1.1.7.6412&rep=rep1&type=pdf>,(Sep. 3, 2001),12 pages.

Ciancarini, Paolo A., et al., "Managing Complex Documents Over the WWW: A Case Study for XML", *Transactions on Knowledge and Data Engineering*, vol. 11, No. 4, Available at < http://citeseerx.ist.psu.edu/viewdoc/download?doi=10.1.1.18.1679&rep=rep1&type=pdf>(Apr. 1999),pp. 1-14.

Clapp, D "The NeXT Application Kit Part 1: Non-Responsive Classes", *The NeXT Bible Chapter 16*, (1990),pp. 275-293.

Clark, James "XSL Transformation (XSLT), Version 1.0", Retrieved from: <www.w3.org/TR/1999/REC-xslt19991116> on Oct. 26, 2009, WC3,(Nov. 16, 1999),57 pages.

Clark, James et al., "XML Path Language (XPath)", Retrieved from: <www.w3.org/TR/1999/RCE-xpath-19991116> on Oct. 26, 2009, Version 1.0,(Nov. 16, 1999),37 pages.

Clark, Peter "From Small Beginnings", *Knowledge Management*, (Nov. 2001),pp. 28-30.

Cover, Robin "XML Forms Architecture (XFA)", Cover Pages. Retrieved from "http://xml.coverpages.org/xfa.html" on Aug. 17, 2006, (Apr. 19, 2000),4 pages.

Dayton, Linnea et al., "Photo Shop 5/5.5 Wow' Book", 2000, Peachpit Press, (2000),pp. 8-17.

Dilascia, Paul et al., "Sweeper", *Microsoft interactive developer*, vol. 1., No. 1, (1996),pp. 16-52.

Dorward, Sean et al., "Unix Variants", *Unix Review*, vol. 10, No. 4, (Apr. 1992),pp. 29-31.

Dyck, Timothy "XML Spy Tops as XML Editor", *eWeek*, vol. 19, No. 47,, (Nov. 25, 2002),3 pages.

Halberg, et al., "Using Microsoft Excel 97", Que Corporation,,(1997),pp. 1-9, 18-25, 85-89, 98-101, 106-113, 124-127, 144-147, 190-201, 209-210, 213-227, 581-590, 632-633, 650-655, 712-714.

Han, Richard et al., "Websplitter: A Unified XML Framework for Multi-Device Collaborative Web Browsing", *ACM Conference on Computer Supported Cooperative Work*, (2000),10 pages.

Hardy, Matthew R., et al., "Mapping and Displaying Structural Transformations between XML and PDF", *Proceedings of the 2002 ACM symposium on Document engineering*, (Nov. 8-9, 2002),pp. 95-102.

Herzner, Wolfgang et al., "CDAM—Compound Document Access and Management. An Object-Oriented Approach", *ACM SIGOIS Bulletin*, vol. 12, Issue 1, MultiMedia Systems Interaction and Applications, Chapter 3,,(Jul. 1991),18 pages.

Honkala, Mikko et al., "Multimodal Interaction with XForms", *ICWE '06*, (Nov. 14, 2006),pp. 201-208.

Hwang, Kai et al., "Micro-Firewalls for Dynamic Network Security with Distributed Intrusion Detection", *IEEE International Symposium on Network Computing and Applications 2001*, (2001),pp. 68-79.

Kaiya, Haruniko et al., "Specifying Runtime Environments and Functionalities of Downloadable Components under the Sandbox Model", *International Symposium on Principles of Software Evolution 2000*, (2000),pp. 138-142.

Kanemoto, Hirotaka et al., "An Efficiently Updateable Index Scheme for Structured Documents", *DEXA'98*, (1998),pp. 991-996.

Kim, Sang-Kyun et al., "Immediate and Partial Validation Mechanism for the Conflict Resolution of Update Operations in XML Databases", *WAIM 2002, LNCS 2419*, 2002, Springer-Verlag Berlin Heidelberg, (2002),pp. 387-396.

Kobayashi, M. et al., "An Update on BTRON-specification OS Development", *Proceedings of the 8thTRON Project Symposium*, 1991, 0-8186-2475-2/91,(1991),pp. 132-140.

Komatsu, Naohisa et al., "A Proposal on Digital Watermark in Document Image Communication and It's Application to Realizing a Signature", *Electronics and Communication in Japan, Part I: Communications*, vol. 73, No. 5, (May 1990),pp. 22-33.

LeBlond, et al., "PC Magazine Guide to Quattro Pro for Windows", Ziff-Davis Press,(1993),pp. 9-11, 42-61.

Mansfield, Ron "Excel 97 for Busy People", Osborne/McGraw-Hill,, (Jan. 27, 1997),pp. 48-50.

McCright, John S., "New Tool Kit to Link Groove with Microsoft SharePoint", Retrieved from: <http://www.eweek.com/c/a/Enterprise-Applications/New-Tool-Kit-to-Link-Groove-With-Microsoft-SharePoint/> Dec. 28, 2009, (Jul. 29, 2002),3 pages.

Musgrave, S "Networking Technology—Impact and Opportunites", *Survey and Statistical Computing 1996*, Proceedings of the Second ASC International Conference, London, UK ,. (Sep. 1996),pp. 369-378.

Noore, Afzel "A Secure Conditional Access System using Digital Signature and Encription", *International Conference on Consumer Electronics*, (Jun. 2003),pp. 220-221.

Pike, Rob et al., "Plan 9 From Bell Labs", AT&T Bell Laboratories, UKUUG, Summer 1990,10 pages.

Pike, Rob et al. "The Use of Name Spaces in Plan 9", *Operating Systems Review*, vol. 27, No. 2, (Apr. 1993),pp. 72-76.

Prevelakis, Vassilis et al., "Sandboxing Application", *FREENIX Track: 2001 USENIX Annual Technical Conference*, (2001),pp. 119-126.

Rado, Dave "How to create a template that makes it easy for users to 'fill in the blanks' without doing any programming,", Retrieved from http://word.mvps.org/FAQs/Customization/FillinTheBlanks.htm, (Apr. 2004),pp. 1-2.

Raggett, "HTML Tables", Retrieved from: <http:www.//is-edu.homuns.edu.vn/WebLib/books/Web/Tel/html3-tables.html>on Aug. 6, 2006, W3C Internet Draft,(Jul. 7, 1995),pp. 1-12.

Rapaport, Lowell "Get More From SharePoint", *Transform Magazine*, vol. 11, No. 3, (Mar. 2002),2 pages.

Rogge, Boris et al., "Validating MPEG-21 Encapsulated Functional Metadata", *IEEE 2002*, ISBN 0-7803-7304-9/02,(2002),pp. 209-212.

Schmid, Mathew et al., "Protecting Data from Malicious Software", *18th Annual Security Applications Conference*, (2002),pp. 199-208.

Staneck, W "Internal and External Media", Electronic Publishing Unleashed, Chapter 22,,(1995),pp. 510-542.

Tomimori, Hiroyuki et al., "An Efficient and Flexible Access Control Framework for Java Programs in Mobile Terminals", Proceedings of 22nd Int'l Conference on Distributed Computing Systems Workshops,(2002),pp. 777-782.

Trupin, J "The Visual Programmer", Microsoft Systems Journal,(Apr. 1996),pp. 103-105.

Usdin, Tommie et al., "XML: Not a Silver Bullet, But a Great Pipe Wrench", *Standard View vol. 6, No. 3*, (Sep. 2, 1998),pp. 125-132.

Varlamis, Iraklis et al., "Bridging XML-Schema and relational database. A System for generating and manipulating relational databases using valid XML documents", DocEng 01, ACM 1-58113-432-0/01/0011,(Nov. 9-10, 2001),pp. 105-114.

Williams, Sara et al., "The Component Object Model: A Technical Overview", Microsoft Corp,(Oct. 1994),pp. 1-14.

Wong, Raymond K., et al., "Managing and Querying Multi-Version XML Data with Update Logging", *DocEng '02*, (Nov. 8-9, 2002),8 pages.

Zdonik, S "Object Management System Concepts", ACM,(1984),pp. 13-19.

"Final Office Action", U.S. Appl. No. 10/976,451, (Jul. 2, 2009),13 pages.

Reagan, Moore W., et al., "Collection-based persistent digital archives", U.S. Appl. No. 60/191,662, filed Mar. 23, 2000, 133.

"Non-Final Office Action", Application U.S. Appl. No. 11/227,550, (Aug. 3, 2009),10 pages.

"Notice of Allowance", U.S. Appl. No. 11/203,937, (Aug. 3, 2009),7 pages.

"Foreign Office Action", Application Serial No. 200610051554.X, (Jul. 10, 2009),11 pages.

"Non-Final Office Action", U.S. Appl. No. 11/234,767, (Aug. 12, 2009),24 Pages.

"Final Office Action", U.S. Appl. No. 10/977,198, (Aug. 19, 2009),15 pages.

"Non-Final Office Action", U.S. Appl. No. 10/939,588, (Aug. 27, 2009),28 pages.

"Final Office Action", U.S. Appl. No. 11/170,521, (Sep. 8, 2009),12 pages.

"Final Office Action", U.S. Appl. No. 10/402,640, (Aug. 28, 2009),17 pages.

"Final Office Action", U.S. Appl. No. 11/107,347, (Mar. 22, 2010), 11 pages.

"Non-Final Office Action", U.S. Appl. No. 10/916,692, (Apr. 5, 2010), 6 pages.

"Non-Final Office Action", U.S. Appl. No. 10/976,451, (Apr. 9, 2010), 11 pages.

"Notice of Allowance", U.S. Appl. No. 11/044,106, (Mar. 15, 2010), 7 pages.

"Supplemental Notice of Allowance", U.S. Appl. No. 10/990,152, (Apr. 19, 2010), 2 pages.

"Supplemental Notice of Allowance", U.S. Appl. No. 11/073,087, (Apr. 19, 2010), 2 pages.

"Non-Final Office Action", U.S. Appl. No. 10/402,640, (Apr. 30, 2010),4 pages.

Brabrand, et al., "Power Forms Declarative Client-side Form Field Validation", (2002),1-20.

Anat, Eyal et al., "Integrating and Customizing Hererogeneous E-Commerce Applications", The VLDB Journal—The International Journal on Very Large Data Bases, vol. 10, Issue 1,(Aug. 2001),16-38.

Adams, Susie et al., "BizTalk Unleashed", Sams publishing, 2002, first printing Mar. 2001,1-2, 31-138.

Vasters, Clemens F., "BizTalk Server 2000 A Beginner's Guide", Osborne/McGraw-Hill,(2001),1-2, 359-402.

Halberg, Bruce et al., "Using Microsoft Excel 97", (1997),191-201, 213-219.

Villard, et al., "An Incremental XSLT Transformation Processor for XML Document Manipulation", http://www2002.org/CDROM/refereed/321, Printed on May 18, 2007,(May 2002),25 pages.

"Final Office Action", U.S. Appl. No. 11/036,910, (May 26, 2010),9 pages.

"Final Office Action", U.S. Appl. No. 11/218,149, (May 19, 2010),17 pages.

"Foreign Office Action", Australian Patent Application No. 2006200285, (May 20, 2010),2 pages.

"Foreign Office Action", Russian Application No. 2006103267, (Apr. 20, 2010),10 pages.

"Foreign Office Action", Russian Application No. 2006105526, (Apr. 15, 2010),10 pages.

"Non-Final Office Action", U.S. Appl. No. 11/295,178, (May 26, 2010),45 pages.

"Non-Final Office Action", U.S. Appl. No. 11/567,140, (May 18, 2010),8 pages.

"Notice of Allowance", U.S. Appl. No. 11/872,703, (May 14, 2010),18 pages.

"Supplemental Notice of Allowance", U.S. Appl. No. 11/044,106, (May 13, 2010),6 pages.

"Supplemental Notice of Allowance", U.S. Appl. No. 11/044,106, (May 19, 2010),5 pages.

* cited by examiner

AUTHORING ARBITRARY XML DOCUMENTS USING DHTML AND XSLT

RELATED APPLICATIONS

This application is a continuation of and claims priority to U.S. patent application Ser. No. 09/599,813, the disclosure of which is incorporated by reference herein.

The following patent applications are related to the present application, are assigned to the assignee of this patent application, and are expressly incorporated by reference herein:

U.S. patent application Ser. No. 09/599,298, entitled "Single Window Navigation Methods and Systems";

U.S. Pat. No. 6,948,135, entitled "Methods and Systems of Providing Information to Computer Users";

U.S. Pat. No. 6,883,168, entitled "Methods, Systems, Architectures and Data Structures For Delivering Software via a Network";

U.S. Pat. No. 7,000,230, entitled "Network-based Software Extensions";

U.S. Pat. No. 6,874,143, entitled "Architectures For And Methods Of Providing Network-based Software Extensions";

U.S. patent application Ser. No. 09/599,086, entitled "Task Sensitive Methods And Systems For Displaying Command Sets".

TECHNICAL FIELD

This invention relates to authoring extensible markup language (XML) documents using dynamic hypertext markup language (DHTML)

BACKGROUND

Extensible markup language (XML) is increasingly becoming the preferred format for transferring data. XML is a tag-based hierarchical language that is extremely rich in terms of the data that it can be used to represent. For example, XML can be used to represent data spanning the spectrum from semi-structured data (such as one would find in a word processing document) to generally structured data (such as that which is contained in a table). XML is well-suited for many types of communication including business-to-business and client-to-server communication.

Given the breadth of data that can be represented by XML, challenges arise when one wishes to provide a user interface to the data that a user can use to manipulate the data or the structure that contains the data. The classical approach to the user interface problem, outside of the XML environment, has been to use different UI technologies for different types of data (e.g. document, tabular data). This approach is clearly not the best when, with XML, it is more likely that a user will encounter and wish to interact with data that is both structured and unstructured. There have been some attempts at solving the problem of enabling a user to manipulate an XML document, but to date, they are extremely inflexible and do not appreciate the full power behind XML and XSL-T, the latter being a transformation that could be used to transform XML into Dynamic HTML or is DHTML. For more information on XML, XSLT and XSD, the reader is referred to the following documents which are the work of, and available from the W3C (World Wide Web consortium): XML Schema Part 0: Primer, Extensible Markup Language (XML) 1.0, XML Schema Part 1: Structures, and XSL Transformations (XSLT) Version 1.0.

Consider, for example, FIG. 1 which illustrates an XML document 100, an XSLT transformation (XSL-T) 102, a resultant DHTML document 104, and an XML schema or XSD file 106. XML document 100 can be represented as a tree-like structure where each node of the tree is a corresponding XML tag. The XML document 100 must conform to an XML schema that is specified by XSD 106. XSL-T 102 is a transformation process that utilizes one or multiple templates to transform the XML document tree into a different type of tree—here a DHTML tree. The DHTML document 104 displays the data that is described in the XML tree. XSL-T is simply a collection of templates that enable the data to be presented, through DHTML in a way that can be defined by a software developer.

Consider, for example, an email message that might have several fields, i.e. "subject", "to", and the like. Each of these fields might be represented in XML as to tags. For example, the "subject" field might be represented as an XML tag "subj". XSL-T creates an engine that attempts to match a current node to various templates, selects one, and may find within that template mode nodes to match. The XSL-T that transforms the XML representation of the email might include a template that matches the "subj" tag. The template would then list the string that is associated with the "subj" tag, but might place the word "Subject:" before the string in the DHTML that is ultimately displayed for the user. This is but a very simple example of the transformation process that can take place using XSL-T. XSL-T can also be used to add information to the information that is represented in an XML document. For example, various headings or other information can be added using XSL-T, with the accompanying data underneath the heading coming from the XML document. Essentially, then, XSL-T provides an extremely robust and flexible way of transforming the data that is described by the XML into a DHTML presentation. One manifestation of XSL-T is that the resultant DHTML structure may bear little resemblance to the corresponding XML tree structure that contains the data that is used by the XSLT to provide the DHTML.

The transition from XML to DHTML is then accomplished through XSL-T. This is generally a one way transition in which data that is described in XML is transformed into a presentation format for the user. Preserving the user experience of being able to interact with the data through its presentation format (e.g. DHTML) is crucial. While the transformation from XML to DHTML is fairly straightforward, there has been no clear transformation that would be the inverse of this transformation (i.e. transforming DHTML to XML) in a manner that is flexible and appreciates the full power of XSL-T. That is, while there are simple solutions to this problem, the robust nature of XSL-T and the differences in the corresponding XML and DHTML trees make it extremely difficult to attempt inverse transformation solutions.

There are solutions that enable a user to enter data in a DHTML document which is then copied back to the XML document. These solutions do not, however, enable a user to change the structure of the XML tree that represents the data. Additionally, there are solutions that are hardcoded solutions that can enable some manipulation of the XML tree given a DHTML modification, but the hardcoded nature of the solutions make them very specific to the data and XML tags with which they are used. For example, one of the XSL-T templates might include a hardcoded solution that allows a user to make structural changes to a table, such as adding a new row. This hardcoded solution is then only usable in connection with the table for which it was specifically defined. If a developer wishes to use the hardcoded solution for a different table, they must physically alter the programmatic solution to specifically apply to their situation. There are solutions which enable authorship of arbitrary XML through user-friendly views, but not through DHTML and XSL-T. Exemplary products include Arbortext's Adept Editor, SoftQuad's XMetal, INRIA's Thot, and FrameMaker's Framemaker for SGML.

Accordingly, this invention arose out of concerns associated with providing user interfaces that enable a user to manipulate a DHTML document with the manipulations being transferred back to the XML tree that represents the data of the DHTML presentation in a flexible, repeatable manner.

SUMMARY

Methods and systems of authoring XML using DHTML views are described. Various user interfaces can be automatically or semi-automatically provided in a DHTML view that enable a user to interact with a DHTML view and change values (e.g. text or properties) of an associated DHTML tree. Value changes are translated to modifications of an associated XML structure. A transformation, e.g. an XSL-T, is applied to the modified XML structure which then changes the DHTML view to reflect the user's interaction. The interfaces, some of which are termed "in document" interfaces, permit a user to interact with a DHTML view and have value modifications automatically made to a corresponding XML document that describes data that is associated with the DHTML view. Presentation of the various "in document" interfaces takes place by considering not only an XML schema (of which the XML document is an instance), but an XSL-T (XSLT transformation) that was utilized to transform the XML document into the DHTML view.

In addition, the notion of a crystal is introduced and is used to map changes in a DHTML view directly back to a corresponding XML document. A crystal, in a basic form, includes one or more behaviors and associated XSL-T. In the illustrated example, a behavior is implemented as binary code that is associated with or attached to DHTML tags that are generated by the XSL-T. The crystals are used to transform XML into the DHTML views. The behaviors of a crystal are defined to be data-shape specific or dependent, with the data shape being defined by the XML document. The behavior is not necessarily dependent upon any schema, data or tags. Because of its data-shape dependent nature, crystals can be packaged for reuse with various XML documents which have no relation to one another other than a shape that is defined by the XML.

Behaviors can be attached to DHTML tags that are generated by the XSL-T. The behaviors ensure that user interactions with the DHTML view are mapped directly back to the XML document. In this way, the XML document can be authored to reflect the changes that are made to the DHTML view by the user.

DETAILED DESCRIPTION

Overview

Figure 1:
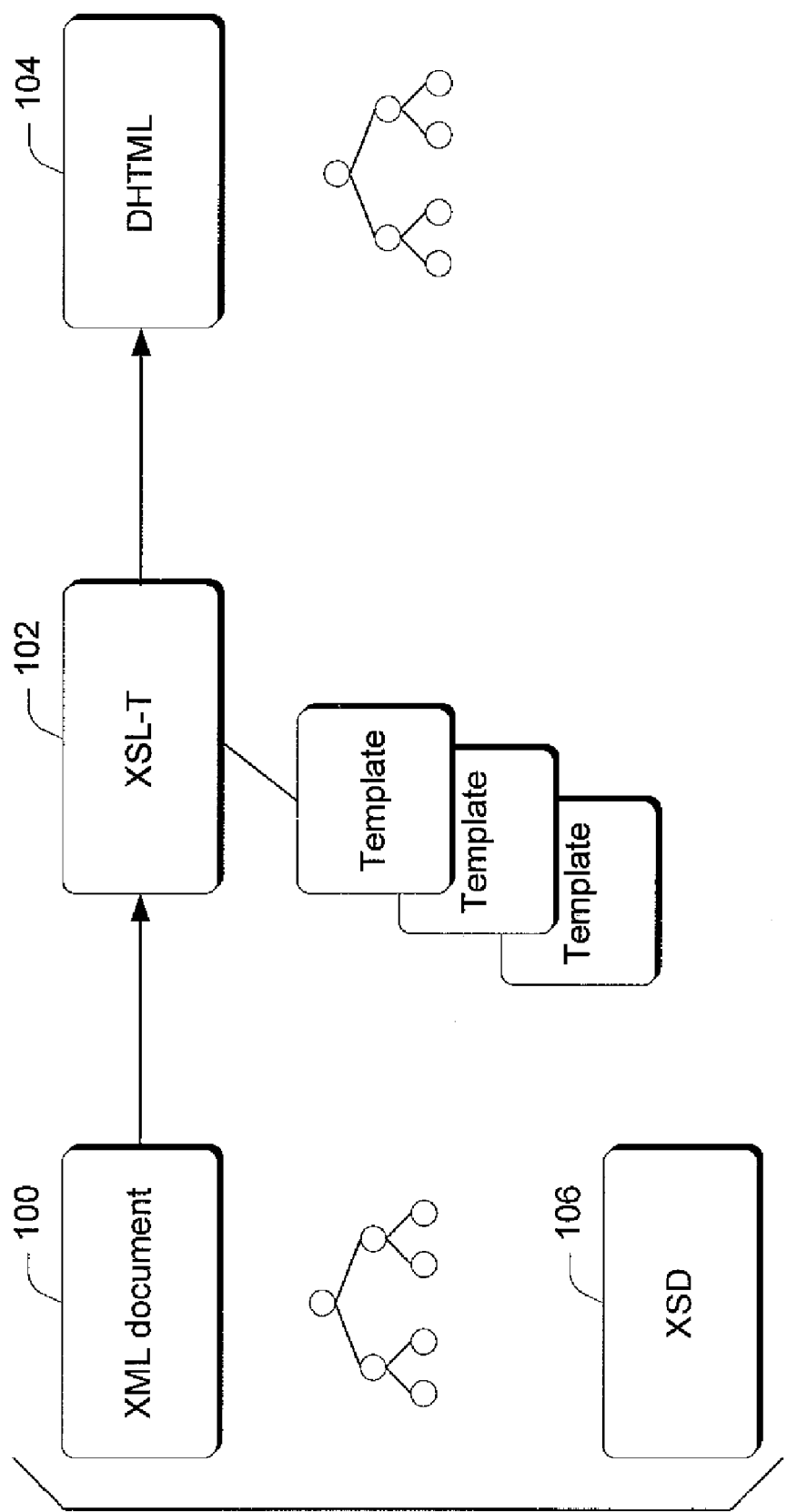
FIG. 1 is a high level block diagram that illustrates an XML document, an XSLT transformation, a DHTML view and a XSD or schema.

Methods and systems of authoring XML using DHTML views are described. In one implementation, various user interfaces can be automatically or semi-automatically provided in a DHTML view that then enable a user to interact with a DHTML view and change values (e.g. text or properties) of an associated DHTML tree. Value changes are translated to modifications of an associated XML structure. A transformation, e.g. an XSL-T, is applied to the modified XML structure which then changes the DHTML view to reflect the user's interaction. The interfaces, some of which are termed "in document" interfaces, permit a user to interact with a DHTML view and have those interactions reflected in a corresponding XML document that describes data that is associated with the DHTML view. These modifications can be made regardless of the complexity of the XSL-T that was utilized to transform the XML into the DHTML. Presentation of the various in document interfaces takes place by considering not only an XML schema (of which the XML document is an instance), but an XSL-T (XSLT transformation) that was utilized to transform the XML document into the DHTML view.

In another implementation, the notion of a crystal is introduced. A crystal, in a basic form, includes one or more behaviors and associated XSL-T. The crystals are used to transform XML into the DHTML views. The behaviors of a crystal are defined to be data-shape specific or dependent, with the data shape being defined by the XML document. The behavior is not necessarily dependent upon any schema, data or tags. Because of its data-shape dependent nature, crystals can be packaged for reuse with various XML documents which have no relation to one another other than a shape that is defined by the XML. In the described implementation, behaviors are attached to the DHTML tags that are generated by the XSL-T. The behaviors ensure that user interactions with the DHTML view are mapped directly back to the XML document. In this way, the XML document can be authored to reflect the changes that are made to the DHTML view by the user. Because crystals are data shape-dependent and not schema dependent, as the shape is defined by the XML document, they can be used for authoring fragments of XML belonging to different schemas; those fragments simply share the same shape.

In this document, the following terminology will be used:

Schema—a file (e.g. an XSD file) describing the schema for a particular type of XML document; schemas typically contain predefined tags and attributes that define the shape of the XML trees that represent an XML document; the schema provides a structure that each XML document must comply with; while editing an XML document, the schema is accessible through an instantiated DOM (document object model) (XDR DOM). Alternately, relevant information can be obtained from the schema and cached for use.

XML document—an instance of an XML schema. Theoretically, for one schema there could be an infinite number of documents that instantiate the schema. When editing a document, the initial version and the final version of the document both adhere to the same schema, though the documents themselves are different. While processing, the XML document is instantiated through an instantiated DOM (XML DOM).

XSLT transformation—an XML file that transforms the XML document into an HTML view; for each XML document there could be any number of XSLT transformations, each creating a different HTML view over the same document. An XSL-T file consists of one or more templates that match elements in the XML document. The XSL-T file that is initially authored by the application author is transformed by NetDocs when applied in edit mode into a NetDocs editing aware XSL-T. This transformation may break out templates into multiple templates, and add the appropriate behaviors (see below) based on NetDocs-specific hints added by the application developer. While editing the XML document, the transformed XSL-T is accessible to NetDocs through an instantiated DOM (XSL-T DOM).

DHTML view—this is the result of the XSLT transformation applied on the XML document. The DHTML tree contains visual cues for displaying the data, but also behaviors. These behaviors are introduced by the XSLT transformation. While there could be behaviors introduced by the author of the XSLT transformation, there are behaviors introduced by NetDocs when it applies the transformation. These latter behaviors hold the logic for:

Copying to the XML DOM the values of the HTML leaf nodes that are modified

Determining, based on the cursor location in the HTML document, what editing services are available in the editing context. The editing context is determined by the HTML context in conjunction with the XSD context and the XSL-T template that was applied to generate that part of the view. The service is made known to the user In-place (in the editing area) for predefined UI structures (e.g. table, grid, calendar control, label)

Enabling the appropriate XML editing context blocks in the NetDocs ContextBlock area.

Modifying the structure of the XML DOM based on the editing service selected

Incrementally updating the HTML view, by refreshing just the part of the view that is affected by the changes to the XML DOM.

Exemplary Computing Environment

The embodiment described just below can be employed in connection with various computer systems. A computer system, for purposes of this document, can be considered as any computing device that includes some type of processor, i.e. a microprocessor, and some type of operating system. Thus, a computer system can be construed to include, without limitation, traditional desktop computers, more powerful servers, various hand-held devices such as cell phones, pocket-held computer devices and the like.

Figure 2:
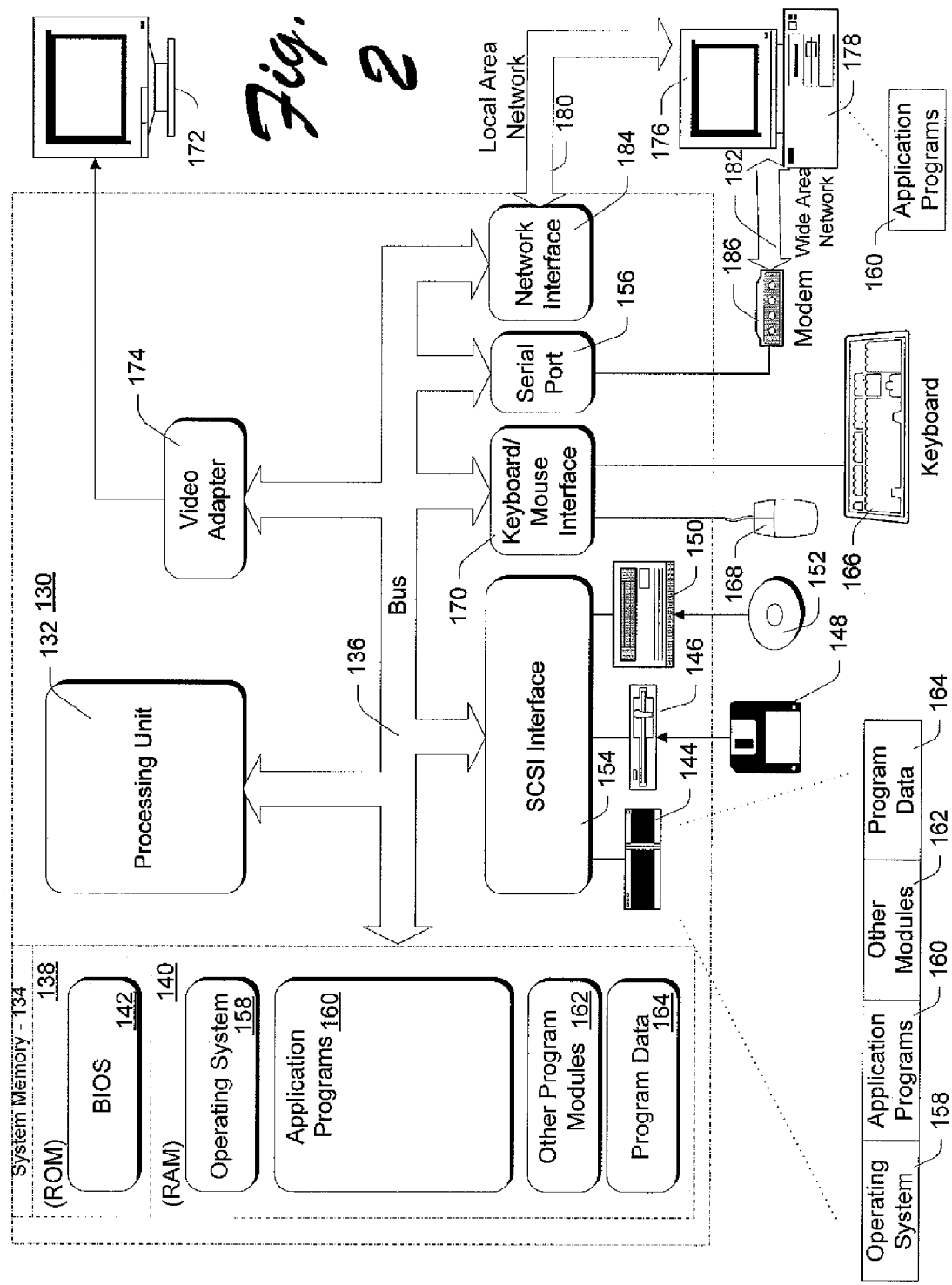
FIG. 2 is a high level diagram of a computer system that can be utilized to implement the described embodiments.

FIG. 2 shows an exemplary computer system that can be used to implement the embodiments described herein. Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable is storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary Implementation

The inventive methods and systems discussed below are configured for use in connection with an implementation, aspects of which are described in the documents incorporated by reference above. That implementation essentially provides a single application program having a single navigable window that can be navigated to multiple different functionalities that are provided by the application program. The functionalities are extensible and can be extended via a network such as the Internet.

Use of Schema and XSL-T to Generate a User Interface

When a user interacts with a DHTML document for the purpose of changing, in some way, the document through either manipulation of one or more of its values or properties, it is important that those manipulations be made, in a consistent manner, to the XML document that describes the structure of the data behind the DHTML document. In order to manipulate the XML document that describes the structure of the data behind the DHTML, there needs to be a way to transform user interactions in the DHTML to changes in the XML document. This is the problem of finding an inverse of the transformation function that is provided by the XSL-T.

In one implementation, the described embodiment addresses this problem by automatically (or semi-automatically, with some hint given by the application developer) generating an appropriate user interface (UI) within the DHTML document that allows the user to manipulate or interact with the DHTML document. The presentation of the UI takes into account not only the XML schema, but also the XSL-T transformations that were utilized to provide the DHTML. This represents a significant departure from other XML authoring solutions that look only to the XML schema to determine what can and cannot be added to an XML document. The UIs thus allow user interaction with the DHTML view (e.g. adding and/or deleting structure) to be directly transferred back to the XML document.

There are many various potential types of UIs that can be presented to a user to enable them to interact with a document. Some examples include, without limitation, context blocks which are automatically added to a window based upon the user's context. Context blocks are discussed in more detail in the Application entitled "Task Sensitive Methods And Systems For Displaying Command Sets", incorporated by reference above. Other forms of UIs can include so-called widgets which are decorations within a document itself that allow a user to interact with the document. For example, if a document contains a table, there can be additional adornments around the table on which a user can click to add or delete a row or column, or to move items around within the column. Another type of UI is an accelerator which allows interaction through the keyboard. For example, if you press "Control-L" some type of predefined action is implemented.

In this described embodiment, a decision process is undertaken that decides which UIs to present to a user and when to present them. That is, there are potentially a number of different UI choices that can be made depending on what a user is doing in a particular document and where they are in the document. An inventive approach is to utilize a number of different parameters and based upon analysis of the parameters make a decision on which UI to present to a user so that they can interact with the DHTML view. In the described embodiment, the following parameters can be used:

Selection of where a user is in a particular DHTML document. This translates to where a user is in a particular XML document because the selection initially starts on the DHTML side and has a correspondence on the XML side;

The portion of the XML schema that corresponds to the user's selection;

The UI types that would be desirable to generate; and

The XSL-T file

In the XSL-T file, there are certain constructs that can be suggestive of certain structures in the resultant DHTML. For example, the XSL-T file may include a "xsl:for-each" construct (i.e. for each customer, take a certain action). This construct is suggestive of a repetitive structure in the DHTML, such as a table or a paragraph. That is, if there are a number of customers, then repeating a certain action would repetitively define a certain type of structure. By considering these XSL-T constructs, certain UI types can be identified that can be displayed for the user.

An example is table editing. For example, if expenses are optional, according to the schema, initially there may be no expenses in a table. The XSL-T would have a "for-each" construct to render each expense, but since there are none in the XML doe, nothing is displayed. The UI should in this case produce a context block for adding an expense.

Once the first expense is created, by re-applying the XSLT transformation, a table is now viewable. At this point, based on the XSL-T hint that there is a "for-each" associated with an expense, and the schema information that multiple expenses can be added, a decision is made to not show the "Add expense" as a context block, but to add an appropriate in-doc UI that would now take over the functionality of adding additional expenses as new rows to the table.

When addressing the problem of which UI to display for the user to enable interaction with a document, it is desirable to keep the overall appearance that is presented to the user as uncluttered as possible. For example, many different context blocks could be presented to user, each with its own engagable buttons that can be engaged by a user for interacting with the DHTML view. This is not desirable though because it can potentially clutter the context block area. It would be more ideal to have "in document" UIs (e.g. widget UIs) within a document that are specific to the document itself and which allow a user to interact with the document. An "in document" UI is a UI that appears within a portion of the document and enables user interaction with a portion of the document. Consider, for example, a Word document that contains an embedded drawing. When the user clicks on the embedded drawing, the drawing can appear within a frame that contains one or more buttons that can be clicked on to manipulate the drawing, e.g. a rotate button to rotate the drawing. The buttons that are associated with the is embedded drawing are considered as "in document" UIs.

In order to provide these types of UIs, the described embodiment examines the XSL-T file to identify which UI candidates are more suited to have their functionalities provided by "in document" UIs.

For example, if the schema specifies that multiple expenses are allowed, and the XSL-T has a "for-each" construct for expenses, by looking at the first element introduced by the XSL-T after an expense is matched, it could determine what kind of helpful UI to add. If an DHTML TABLE is created, then it should be adorned with table-editing widgets, but if there is SPAN, for example, then create a context block, and not an in-doc UT.

That is, the above-described context blocks are not "in document" because they are provided within a pane that is disposed adjacent a document area within which a user can work on a document. One goal of the described embodiment is to identify UIs, based upon the analysis discussed below, that are the best candidates for incorporation as "in document" UIs that specifically adorn document portions and permit user interaction with the document itself.

Consider that, without taking into account the XSL-T in the analysis of which UIs to present to a user, the only UIs that could be presented would not be in-document UIs. The context blocks are the most generic UI constructs in the present example. But if we know that we have a table created in DHTML, then the context blocks can be replaced by in-doc constructs. By inspecting the XSL-T we can find out what DHTML construct is created by the XSLT transformation. That is, without consideration of the XSL-T, only generic UIs, e.g. the context block UIs, would likely be generated. For example, if a user is working within a DHTML document that contains a table, a context block can be provided that enables the user, through manipulation of various "out of document" UIs to manipulate the table, e.g. adding a row, column and the like. By considering the XSL-T, the UI that is produced can be refined and the context blocks, or at least a portion of the functionality that is provided by the context blocks, can be replaced with other types of in document UIs. The XSL-T is thus used for refinement of the UIs.

Figure 3:
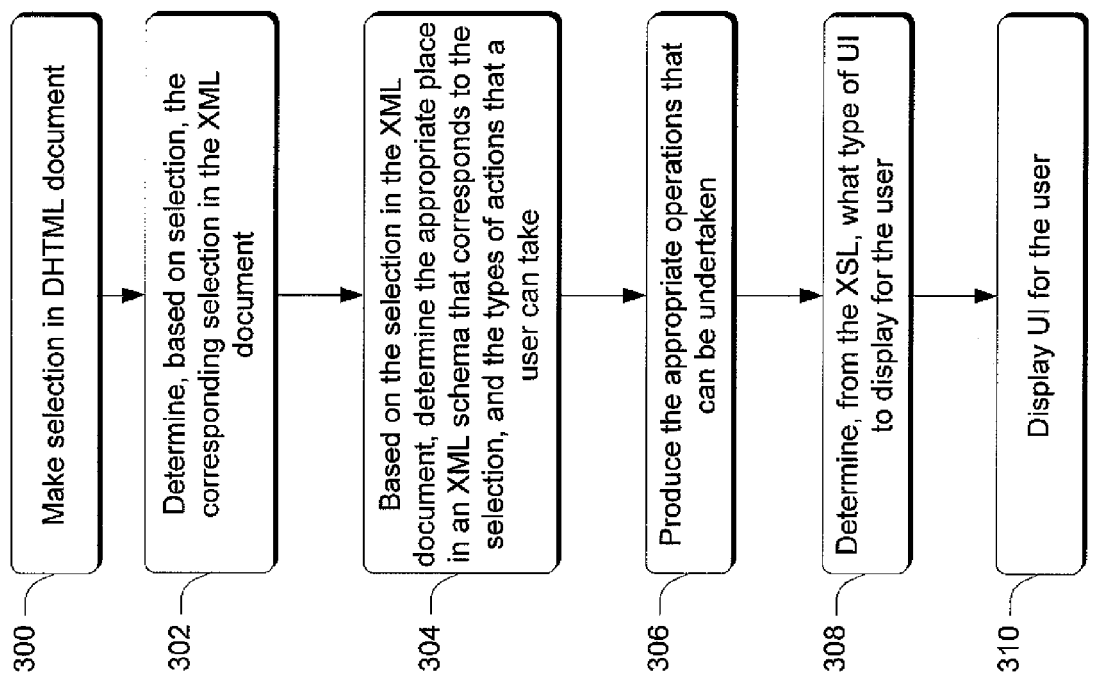
FIG. 3 is a flow diagram that describes steps in a method in accordance with one described embodiment.

FIG. 3 shows a flow diagram that describes steps in a UT generation method in accordance with this described embodiment. Step 300 makes a selection in a DHTML document. This step is implemented by a user moving their cursor to a particular area within a document Step 302 determines, based upon the user's selection, the corresponding selection in the XML document. For example, if a user has selected a particular portion of a table used to display a specific fragment of the XML document, then this step determines the exact fragment of the XML document that corresponds to the user's selection. Based on the selection in the XML document, step 304 determines the appropriate place in the XML schema that corresponds to the selection and the various types of actions that can be taken from this selection. The various types of actions correspond to the various ways in which a user might manipulate the portion of the document that they have selected. Step 306 then produces the appropriate operations that can be undertaken for the various action types. For example, if the user is working in a table, this step might produce operations for adding a row or column or deleting a row or column. Once the operations are produced by step 306, step 308 determines, from the XSL-T file, what type of UI to display for the user. If the XSL-T is not considered in this process, then the available UIs would be presented as context blocks (i.e. not "in document" UIs). By using the XSL-T, the described embodiment refines the production of context blocks by reducing the number of context blocks that are produced and, instead, producing "in document" UIs that now relocate the functionality that would otherwise be provided by the context blocks.

Manipulation of XML Structures Using Crystals

Recall that one of the benefits of XML is the richness with which data can be described. XML, by its very nature, can provide a wide variety of variations of data. Because of this, UI solutions for interacting with data (displayed in DHTML using XSL-T) have been hardcoded and specific to individual schemas. This is a manifestation of the ease with which hard-coded solutions can be provided through XSL-T.

In one described embodiment, the notion of a crystal is introduced to enable interactions with a DHTML view to be directly mapped back to the XML file or tree. Advantageously, the crystals are configured to work on various data shapes, independent of the XML schemas. This means that when the data has a particular shape, as defined by the XML tree that contains the data, specific crystals that are configured for that particular shape can be used to render the DHTML and also ensure that user interactions with the DHTML view are directly mapped back to the XML tree. The crystals do not care about the specific data that is provided by the data shape, nor the schema or tags that are used to contain the data.

Figure 4:
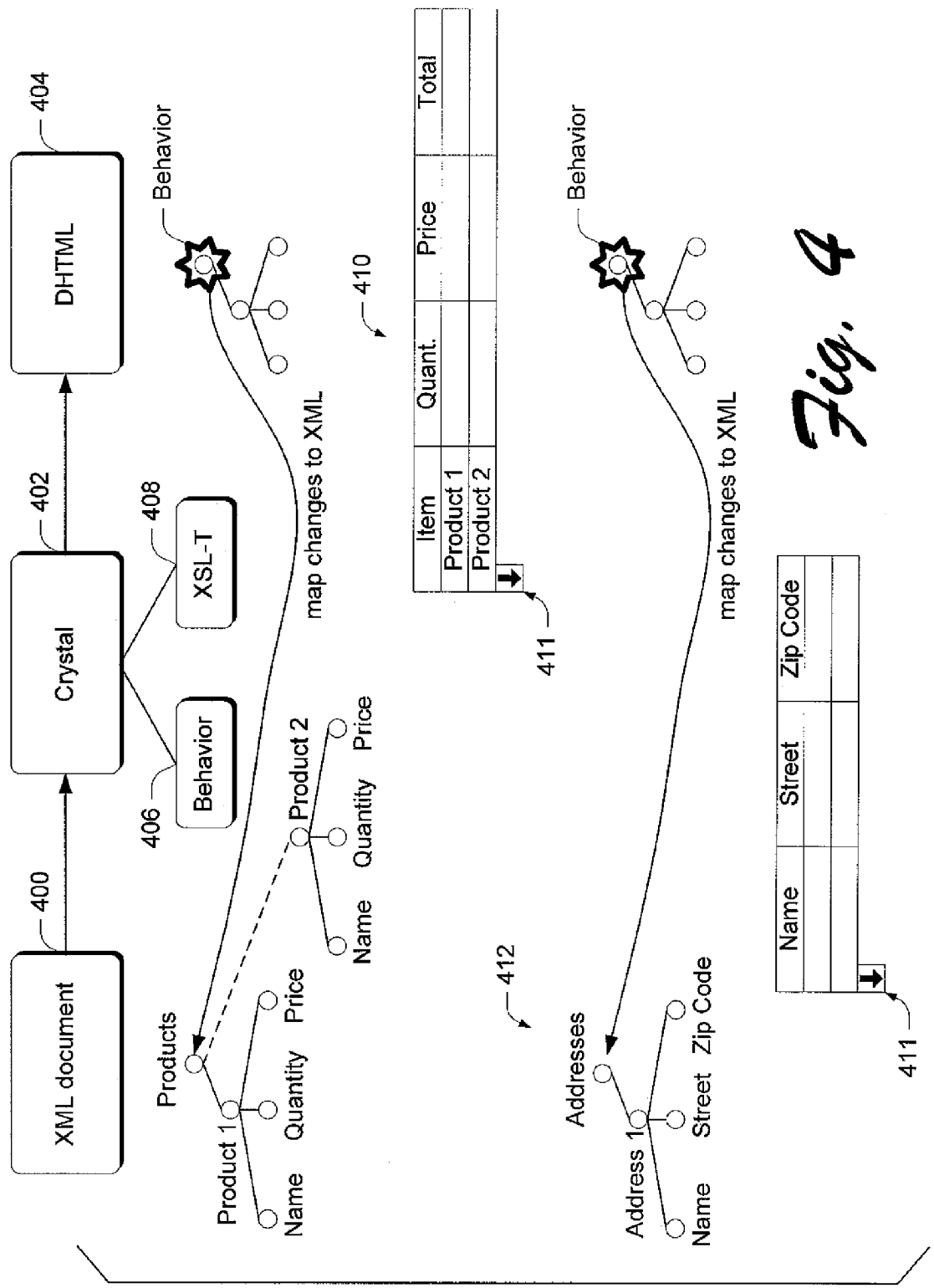
FIG. 4 is a block diagram that illustrates one aspect of how changes to a DHTML view get mapped back to a corresponding XML document.

Consider, for example, FIG. 4 which shows an XML document 400, a crystal 402 and the resultant DHTML document 404. In one basic form, a crystal comprises one or more behaviors 406 and the basic XSL-T 408 that is utilized to transform the XML into the DHTML. The behaviors are implemented, in this particular example, as binary code that is associated with or attached to the DHTML tags that are generated by the XSL-T. Consider, for example, the hierarchical tree that is shown directly below XML document 400. This hierarchical tree represents a portion of an XML tree that is maintained in memory. In this example, the tree has a "products" root node and a "product 1" node that is a child of the "products" root node. Underneath the "product 1" node are three children nodes labeled "name", "quantity", and "price". This XML tree may thus represent a portion of a purchase order that is utilized to purchase various products. When rendered by the crystal 402, the resulting DHTML view is shown at 410. This DHTML view is diagrammed directly above view 410 as a tree with a behavior associated with a DHTML tag. The DHTML view is essentially a table that contains data that is provided by the XML document. Assume now that a user wishes to modify the purchase order by adding an additional product with a corresponding quantity and price. In the past, the solution to this problem might be to hardcode a function that added a specific "product tag" to the XML and then, correspondingly, to the DHTML view. This is a very inflexible solution that is tied specifically to the schema and tags of the XML document. In the described example, modification of the XML document takes place via the behavior or it behaviors that are associated with the crystal 402. Specifically, the behavior that is defined for this particular XML tree structure includes the modifications that can be made to the XML document and a mapping that maps the changes to the DHTML view using application of XSL-T. This behavior is data shape-dependent and not schema-or data-dependent.

This is diagrammatically illustrated in FIG. 4 by the DHTML tree structure shown underneath the DHTML view 404. There, a node corresponding to the "product" node is shown adorned with a behavior. This behavior is binary code that enables a user to interact, via an appropriate UI (such as an in document "add product" button 411 attached to the table) with the DHTML view and have any defined modifications made by the user mapped back to the appropriate XML tree. When a user interacts with the DHTML view, the XML tree is structurally manipulated (as by adding the appropriate tags and structure), and then the XSL-T is invoked to redisplay the DHTML view.

In the purchase order example, assume that the user adds a new product to the DHTML view table by clicking on "add product" button 411 which adds a new row to table 410. In this example, when the new product is added, the behavior or binary code maps the modification back to the XML tree and incorporates the modification by making a structural change to the XML tree. In this specific example, the structural change would include adding a branch to the XML tree to represent the newly-added product. This added branch is shown as the dashed branch on the "Products" XML tree.

Consider the second XML tree 412 shown directly below the Products AML tree. That tree is an "Addresses" XML tree and is associated with addresses that might appear in an address book. This data is extremely different from the data that is associated with the Products XML tree. In fact, there is no relation at all between the data. Notice, however, that the Addresses XML tree has the same shape as the XML tree appearing directly above it. In the described embodiment, a similar crystal can be used to render a DHTML address book that contains entries for a name, street and zip code. The crystal would likely contain slightly different XSL-T for labeling purposes, but can contain the same exact behavior that was utilized in the above example to manipulate the structure of the Products XML tree. To this extent, a user interface button 411 is provided on the Address table and includes the same behavior as the user interface button associated with the Products table. Thus, when a user adds an entry to their address book, the behavior, or binary code, that is associated with the DHTML "Address" tag would ensure that any changes made to the DHTML view are mapped directly back to the corresponding XML document.

The crystals can advantageously be prepackaged software containers that include the behaviors that are specific to the shape of the data and not necessarily dependent upon the schema or specific data that may be contained by an XML document. This approach is very well suited to handling complex XSLT transformations which naturally flow from the robustness that XSL-T provides. By incorporating and associating behaviors in the DHTML tree, problems associated with handling complex XSLT transformations insofar as XML authoring is concerned are solved. This approach is extremely flexible and is not tied to any one schema or specific data, as were the solutions in the past. This approach also provides the application developer with the ability to develop complex XSL-T, without worrying about how the underlying XML is going to be manipulated responsive to a user manipulating the DHTML document. Further, because the approach utilizes crystals having behaviors that are specific to data shape and not specific to schema or data, the crystals are reusable across any XML documents that have shapes that correspond to the shapes for which the various crystals were designed.

Figure 5:
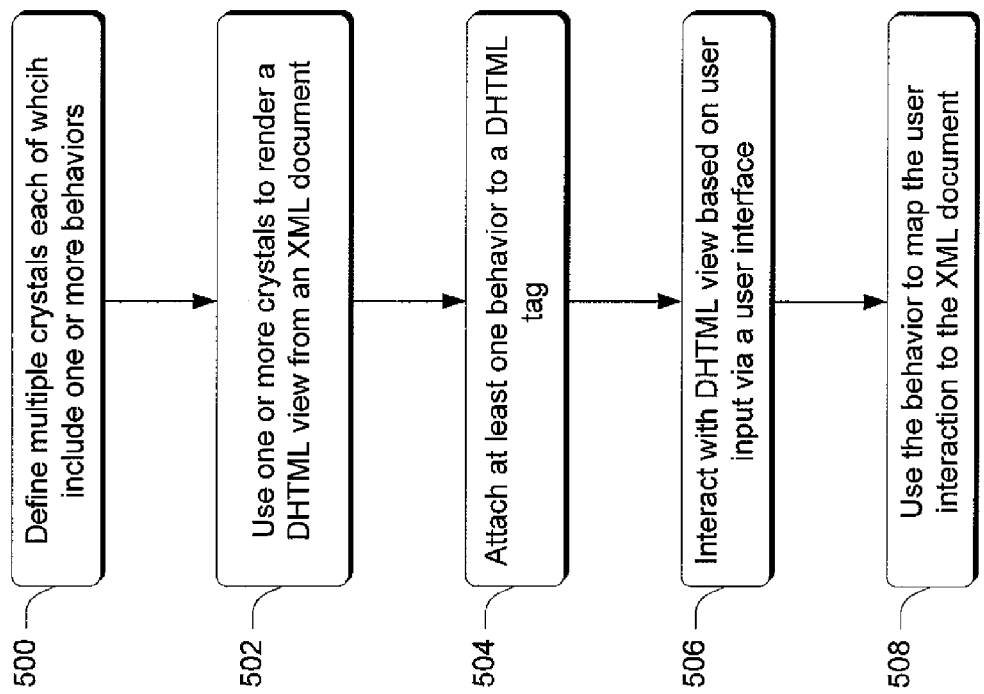
FIG. 5 is a flow diagram that describes steps in a method in accordance with one described embodiment.

FIG. 5 is a flow diagram that shows steps in a method in accordance with the embodiment described above. Step 500 defines multiple crystals each of which include one or more behaviors. In the described example, behaviors are implemented as binary code. The behaviors are specific to a data shape and do not depend on a schema or specific data. Step 502 uses one or more of the crystals to render a DHTML view from an XML document. Step 504 attaches at least one behavior to a DHTML tag. The behavior ensures that any modifications that are made to the DHTML view are mapped back to and appropriately change the XML document that contains the data in the DHTML view. Step 506 interacts with the DHTML view in some way, based upon user input via a UI. This step can be implemented by a user interacting with some type of structure, for example a table, within the DHTML view. Responsive to the user interaction with the DHTML view, step 508 uses the behavior to map the user's interaction back to the XML document and make the appropriate structural changes in the XML tree that contains the data. For example, the XML branch in FIG. 4 off of the "Products" node, indicated with a dashed line, might be the result of a user who adds a new product to the purchase order provided in the DHTML view.

EXAMPLE

The above approach is very flexible and can be conveniently used by application developers to provide applications. Assume that an independent software vendor (ISV) develops applications for end users and he wants to construct a purchase order. The ISV can select an appropriate XML schema for the purchase order which would then define the types of tags that the purchase order can contain. The ISV would need to write the appropriate XSL-T that could present the purchase order in DHTML in a ISV-defined manner. Perhaps the ISV wants to make the purchase order specific to a particular company. The XSL-T provides a way for the ISV to do this. That is, each ISV may wish to present their data differently in a way that is specific to the ISV. Thus, while they each may use the same schema, there will be many different instances of the schema each of which can be potentially very different from the others. One goal of the crystal-based implementation discussed above, is that it should be very easy for ISVs to develop applications based on XML. Accordingly, when the ISV writes their XSL-T, they can incorporate various behaviors that are provided by multiple different crystals. These crystals are predefined so that the ISV need not worry about defining them. They can simply select the crystals that are appropriate for their shape of data, and incorporate them with XSL-T. Now, when the XML is transformed into DHTML, user interactions with the DHTML view can be mapped to the underlying XML document.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method of providing a user interface (UI) comprising:
   rendering a DHTML document from an XML document using a crystal, the crystal containing one or more behaviors and at least one XSLT transformation (XSL-T);
   presenting a user interface based, at least in part, on the XSL-T that was used to render the DHTML document;
   receiving, via the user interface, user interactions with the DHTML document; and
   mapping, via the one or more behaviors, the user interactions to the XML document.

2. The method of claim 1, wherein said presenting comprises automatically presenting the user interface.

3. The method of claim 1, wherein the user interface comprises a context block.

4. The method of claim 1, wherein the user interface comprises an in-document user interface.

5. The method of claim 1, wherein the user interface comprises an accelerator.

6. The method of claim 1, wherein the user interface comprises one or more of the following: a context block, an in-document user interface, and an accelerator.

7. The method of claim 1, wherein the presenting comprises deciding which user interface to present from a number of user interfaces.

8. The method of claim 7, wherein deciding comprises:
ascertaining a user's actions within a document; and
presenting a user interface based on the ascertained user's actions.

9. One or more computer-readable media having computer-readable instructions thereon which, when executed by a computer, implement the method of claim 1.

10. A method of providing a user interface comprising:
considering multiple parameters one of which includes an XSL-T file; and
based upon the considered parameters, rendering a user interface sufficient to enable a user to interact with a DHTML view that has been rendered from an XML document using a crystal, the crystal containing one or more behaviors and at least one XSL-T file; and
receiving, via the user interface, a user interaction with the DHTML view; and
mapping, via the one or more behaviors, the user interaction to the XML document.

11. The method of claim 10, wherein one parameter comprises a user location within a particular document.

12. The method of claim 10, wherein one parameter comprises a portion of an XML schema that corresponds to a user's selection.

13. The method of claim 10, wherein one parameter comprises one or more UI types that would be desirable to generate.

14. The method of claim 10, wherein the parameters comprise:
a user location within a particular document;
a portion of an XML schema that corresponds to a user's selection; and
one or more UI types that would be desirable to generate.

15. The method of claim 10, wherein the considering of the multiple parameters comprises considering one or more constructs within an XSL-T file.

16. The method of claim 10, wherein the considering of the multiple parameters comprises identifying from multiple user interfaces which user interfaces are more suited to have their functionalities provided by an in-document user interface.

17. The method of claim 10 further comprising modifying structure of the XML document based upon the user engaging the user interface.

18. The method of claim 10, wherein the user interface comprises an in-document user interface.

19. One or more computer-readable media having computer-readable instructions thereon which, when executed by a computer, implement the method of claim 10.

20. A method of providing a user interface comprising:
rendering a DHTML view from an XML document using a crystal, the crystal containing one or more behaviors and at least one XSL-T file;
making a selection in the DHTML view;
determining, based upon the selection, a corresponding selection in the XML document;
determining, based upon the corresponding selection in the XML document, a corresponding portion of an XML schema;
determining, based upon the XML schema portion, one or more types of action that can be undertaken;
producing one or more operations that can be undertaken for various determined action types; and
determining, from the XSL-T file that rendered the DHTML view, a user interface type that can be displayed for a user and used to implement the one or more operations.

* * * * *